US009671896B2

(12) United States Patent
Hirano

(10) Patent No.: US 9,671,896 B2
(45) Date of Patent: Jun. 6, 2017

(54) INTERFACE SYSTEM, OBJECT FOR OPERATION INPUT, OPERATION INPUT SUPPORTING METHOD

(71) Applicant: TOSHIBA TEC KABUSHIKI KAISHA, Shinagawa-ku, Tokyo (JP)

(72) Inventor: Takahisa Hirano, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 72 days.

(21) Appl. No.: 14/546,006

(22) Filed: Nov. 18, 2014

(65) Prior Publication Data

US 2016/0139722 A1    May 19, 2016

(51) Int. Cl.
| | |
|---|---|
| G06F 3/041 | (2006.01) |
| G06F 3/044 | (2006.01) |
| G06K 19/00 | (2006.01) |
| G06F 3/045 | (2006.01) |
| G06F 3/0354 | (2013.01) |
| A63F 13/2145 | (2014.01) |
| H04M 3/56 | (2006.01) |

(52) U.S. Cl.
CPC ........ G06F 3/0416 (2013.01); A63F 13/2145 (2014.09); G06F 3/0354 (2013.01); G06F 3/041 (2013.01); G06F 3/044 (2013.01); G06F 3/045 (2013.01); G06K 19/00 (2013.01); *G06F 2203/04104* (2013.01); *H04M 3/567* (2013.01)

(58) Field of Classification Search
CPC ........ G06F 3/0416; G06F 3/044; G06F 3/011; G06F 3/0433; G06F 15/00; G06T 7/004; H04N 7/15
See application file for complete search history.

(56) References Cited

U.S. PATENT DOCUMENTS

| | | | |
|---|---|---|---|
| 5,419,169 A | 5/1995 | Kirii | |
| 5,784,282 A * | 7/1998 | Abitbol | B25J 9/1692 700/186 |
| 9,298,320 B2 * | 3/2016 | McCaughan | G06F 3/0425 |
| 9,317,154 B2 | 4/2016 | Perlin et al. | |
| 2004/0179723 A1 * | 9/2004 | Sano | G06K 9/00033 382/124 |
| 2006/0149495 A1 * | 7/2006 | Mazalek | G06F 3/011 702/150 |
| 2007/0257915 A1 * | 11/2007 | Kutaragi | G06F 3/011 345/427 |
| 2008/0278336 A1 | 11/2008 | Ortega et al. | |

(Continued)

FOREIGN PATENT DOCUMENTS

JP    2005-261843    9/2005

*Primary Examiner* — Fred Tzeng
(74) *Attorney, Agent, or Firm* — Amin, Turocy & Watson LLP

(57) ABSTRACT

According to an embodiment, an interface system includes a touch panel, a pattern detecting unit, and an identification information acquisition unit. The touch panel supports a multi-touch input. The pattern detecting unit detects a pressing pattern of a pressing portion having a predetermined shape that is provided on a mounted portion of a predetermined object to be mounted on the touch panel. The identification information acquisition unit acquires information indicated by the pressing pattern to be detected by the pattern detecting unit as identification information of the object mounted on the touch panel.

19 Claims, 24 Drawing Sheets

(56) References Cited

U.S. PATENT DOCUMENTS

| | | | |
|---|---|---|---|
| 2010/0265204 A1* | 10/2010 | Tsuda | G06F 1/1626 345/174 |
| 2012/0109455 A1* | 5/2012 | Newman | G06F 3/03547 701/36 |
| 2013/0176283 A1* | 7/2013 | Nakata | G06F 3/042 345/175 |
| 2014/0009417 A1* | 1/2014 | Sugimoto | G06F 3/0488 345/173 |
| 2014/0019913 A1* | 1/2014 | Newman | G06F 3/0488 715/810 |
| 2014/0182952 A1 | 7/2014 | Yuen et al. | |
| 2014/0184572 A1* | 7/2014 | Ito | G06F 3/0418 345/178 |
| 2014/0223383 A1* | 8/2014 | Yarita | G06F 3/0416 715/863 |
| 2014/0232669 A1* | 8/2014 | Ohlsson | G06F 3/0414 345/173 |
| 2015/0062029 A1* | 3/2015 | Saito | G06F 3/0416 345/173 |

* cited by examiner

FIG. 18

| Object ID | TYPE | INFORMATION UNIQUE TO OBJECT | CORRESPONDING INFORMATION |
|---|---|---|---|
| 2345 (Car) | PROJECTION TYPE PRESSING PORTION | RIGHT FRONT WHEEL ID:2347 | Car name |
| | | LEFT FRONT WHEEL ID:2348 | Wheelbase:106.3cm |
| | | RIGHT REAR WHEEL ID:2349 | New design fron grille |
| | | LEFT REAR WHEEL ID:2350 | Price |
| ... | ... | ... | ... |
| 2797 | LIGHT RECEIVING UNIT ON BOTTOM SURFACE (LIGHT GUIDING UNIT) | X0,Y0–X50,Y50 PROJECTION SURFACE 1 | Game name |
| | | X50,Y0–X100,Y50 PROJECTION SURFACE 2 | Character name |
| | | X0,Y50–X50,Y100 PROJECTION SURFACE 3 | Item name |
| | | X50,Y50–X100,Y100 PROJECTION SURFACE 4 | Character.mp3 |
| ... | ... | ... | ... |

FIG. 19

| Object ID | TYPE | INFORMATION UNIQUE TO OBJECT | CORRESPONDING INFORMATION |
|---|---|---|---|
| ... | ... | ... | ... |
| 3251 | REFLECTION SURFACE ON SIDE SURFACE | FIRST SIDE SURFACE: WHOLE REFLECTION SURFACE | Product name |
| | | SECOND SIDE SURFACE: WHOLE REFLECTION SURFACE | Price |
| | | THIRD SIDE SURFACE: WHOLE REFLECTION SURFACE | Size |
| | | FOURTH SIDE SURFACE: WHOLE REFLECTION SURFACE | Shop information |
| ... | ... | ... | ... |
| 3456 (Dish) | ELASTIC BODY TYPE PRESSING PORTION | REFERRING TO PREDETERMINED WEIGHT ESTIMATION TABLE | IMG1240.jpg |
| | | | Music.mp3 |
| ... | ... | ... | ... |

*FIG. 23*

| Object ID | CONTACT AREA OF PRESSING PATTERN [mm$^2$] | ESTIMATED WEIGHT OF TARGET TO BE MEASURED [g] |
|---|---|---|
| 1111 (Glass) | 300 | 100 |
| | 320 | 130 |
| | 350 | 160 |
| | 380 | 200 |
| . . . . | . . . . | . . . . |
| 3456 (Dish) | 560 | 320 |
| | 590 | 370 |
| . . . . | . . . . | . . . . |

FIG. 24

| Object ID | CONTACT AREA OF PRESSING PATTERN [mm²] | ESTIMATED HARDNESS OF TARGET TO BE MEASURED [kgf/cm²] |
|---|---|---|
| 7890 (Fish) | 300 | 4.0 |
| | 320 | 3.0 |
| | 350 | 1.5 |
| | 380 | 0.2 |
| · · · · | · · · · | · · · · |
| 12574 (Meat) | 560 | 5.0 |
| | 590 | 4.5 |
| · · · · | · · · · | · · · · |

INTERFACE SYSTEM, OBJECT FOR OPERATION INPUT, OPERATION INPUT SUPPORTING METHOD

FIELD

Embodiments described herein relate generally to an interface technology using a touch panel.

BACKGROUND

In the related art, a touch panel is known as an interface in which a user can input an operation through a touch operation.

For example, in a case of a touch panel that supports a multi-touch input, an intuitive operation such as zooming can be performed by touching a plurality of points simultaneously.

However, in an interface system using only the touch panel of the related art, for example, at the time of an input of relatively complicated information such as detailed specifications or the like of a product, it is hard to say that efficiency of the input of the information is high.

In addition, for example, when information related to a specific product is intended to be shared using a touch panel display including the touch panel in the related art, three-dimensional characteristics of the product are hard to grasp because the target product is only displayed on a screen of the touch panel display.

Furthermore, when participants in a conference of the like intend to share information by displaying an image on a screen of a touch panel display, the visibility from positions of all users is not necessarily excellent due to the influence of viewing angles or the reflection of light on the screen of the touch panel display, so the information is hard to share in some cases.

Therefore, from a viewpoint of efficiency of an input of information and visibility of information to be presented to a user, the interface system using only the touch panel in the related art has a problem that needs to be solved as a man-machine interface.

SUMMARY

In accordance with an embodiment, an interface system is disclosed. The interface system comprises a touch panel that supports a multi-touch input; a pattern detecting unit that detects a pressing pattern of a pressing portion having a predetermined shape provided on a mounted portion of a predetermined object to be mounted on the touch panel; and an identification information acquisition unit that acquires information indicated by the pressing pattern to be detected by the pattern detecting unit as identification information of the object mounted on the touch panel.

DESCRIPTION OF THE DRAWINGS

FIG. 18 is a diagram illustrating an example of a table storing various pieces of information corresponding to identification information.

FIG. 19 is a diagram illustrating an example of a table storing various pieces of information corresponding to identification information.

FIG. 23 is a data table illustrating an example of a relationship between weight and a contact area of a pressing pattern of a pressing portion.

FIG. 24 is a data table illustrating an example of a relationship between hardness of a frozen object and a contact area of the frozen object with a touch panel display.

DETAILED DESCRIPTION

Hereinafter, embodiments will be described with reference to the accompanying drawings.

System Configuration

Figure 1:
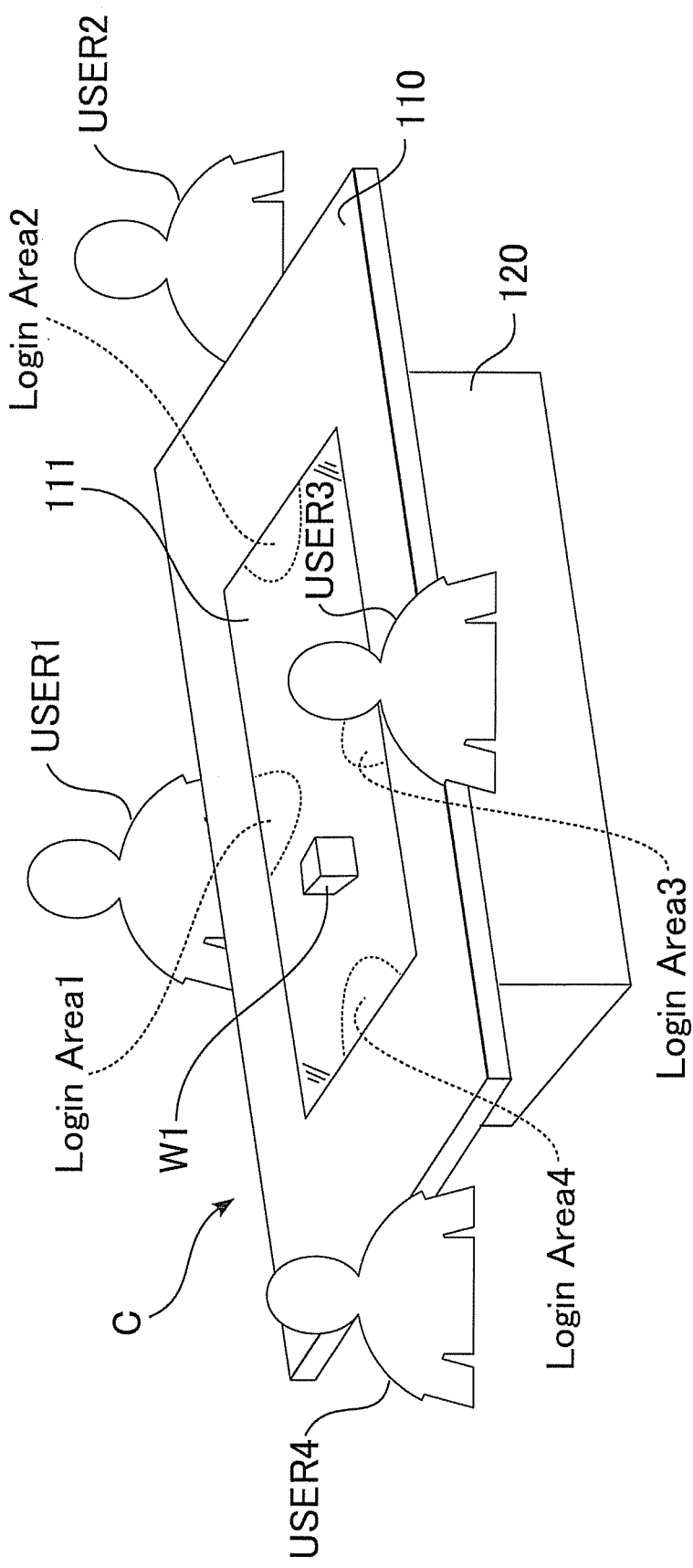
FIG. 1 is a view illustrating an example of a system configuration of an interface system according to an embodiment.

FIG. 1 is a view illustrating an example of a system configuration of an interface system according to an embodiment.

As shown in FIG. 1, the interface system according to the embodiment includes, for example, a communication table C and an object W1.

Here, the communication table C includes, for example, a touch panel display 111, a table 110, and a base 120. In addition, here, a case in which a touch panel display is incorporated in a table is exemplified, without being limited thereto. It is obvious that a tablet terminal single body or the like in which a touch panel display is installed can be used instead of the communication table C in the interface system according to the embodiment.

Here, the touch panel display 111 incorporated in the communication table C is a touch panel display that supports a multi-touch input in which touch operations performed at multiple points simultaneously can be recognized. As a specific example of the touch panel display that supports a multi-touch input herein, a touch panel display that supports a multi-touch input of a resistance film system or an electrostatic capacitance system is exemplified. However, without being limited thereto, any touch panel display that supports a multi-touch input can be adopted to the present system.

Figure 2:
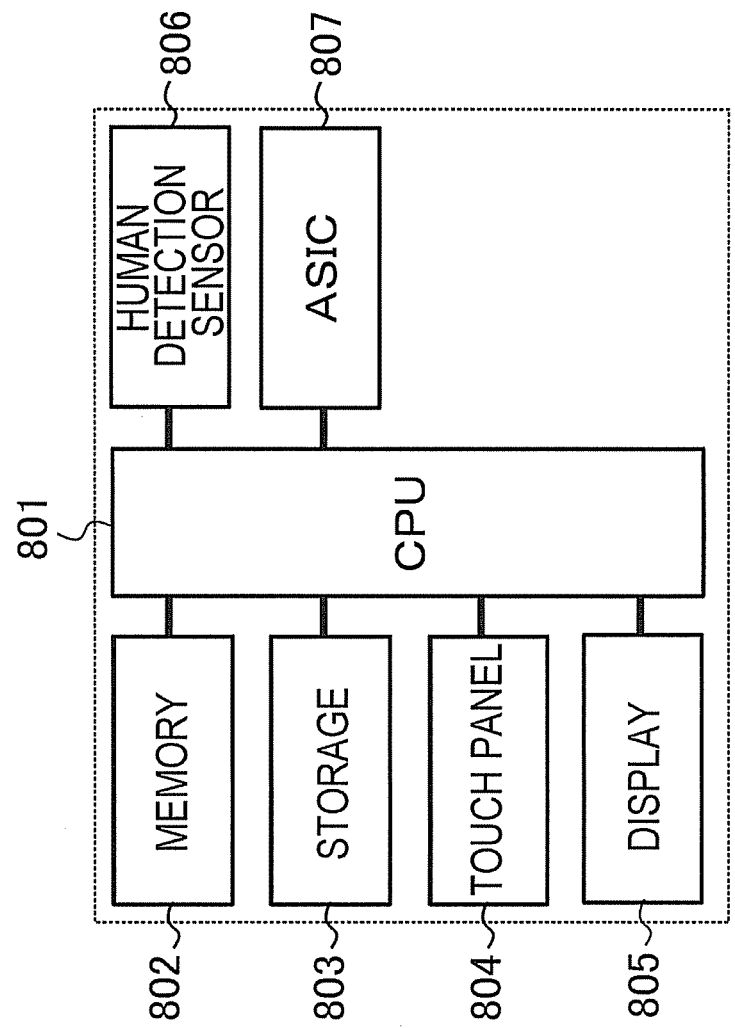
FIG. 2 is a functional block diagram illustrating functions of a communication table constituting the interface system.

FIG. 2 is a functional block diagram illustrating functions of a communication table constituting the interface system according to the embodiment.

As shown FIG. 2, the communication table C includes, for example, a Central Processing Unit (CPU) 801, an Application Specific Integrated Circuit (ASIC) 807, a memory 802, a storage 803 configured of a Hard Disk Drive (HDD) and the like, a touch panel 804, a display 805, and a human detection sensor 806.

The display 805 can be configured of, for example, an electronic paper, a Liquid crystal display (LCD), Electronic Luminescence (EL), a Plasma Display Panel (PDP), and a Cathode Ray Tube (CRT) or the like.

In the communication table C, the CPU 801 has a role of performing various processes in the interface system of the present embodiment and implementing various functions by executing programs stored in the memory 802, the storage 803, and the like. In addition, it is obvious that the CPU 801 can be realized by a Micro Processing Unit (MPU) which can perform equivalent arithmetic processing. Furthermore, the storage 803 can be replaced by a memory device such as a flash memory in the same manner.

The memory 802 can be configured of, for example, a Random Access Memory (RAM), a Read Only Memory (ROM), a Dynamic Random Access Memory (DRAM), a Static Random Access Memory (SRAM), a Video RAM (VRAM), and a flash memory, and has a role of storing various pieces of information or programs to be used for the interface system of the present embodiment.

As the human detection sensor 806, for example, various types of sensors such as an infrared sensor, an ultrasonic sensor, and a visible light sensor can be used. The human detection sensor 806 has only to grasp a position where a user is present with respect to the communication table C. For example, a mechanical switch provided in a chair or the like can be adopted as a human detection sensor.

Certainly, in addition to the grasping of the user position by the human detection sensor 806, it is possible to grasp the user position through a software based on a result of user authentication in Login Areas 1 to 4 by providing authentication screens such as the Login Areas 1 to 4 in the touch panel display 111 of the communication table C. Furthermore, for example, the position may be set based on an operation input for specifying the user position by the user, or the position of the user with respect to the touch panel display may be determined based on imaging data of a CCD camera or the like.

Next, an object (object for an operation input) which can be adopted in the interface system according to the present embodiment will be described in detail. There are various kinds of objects which can be adopted in the present interface system. Here, as an example, six kinds of (first to sixth) objects having characteristics which are different from each other will be described.

First, a first object W1 will be described.

Figure 3:
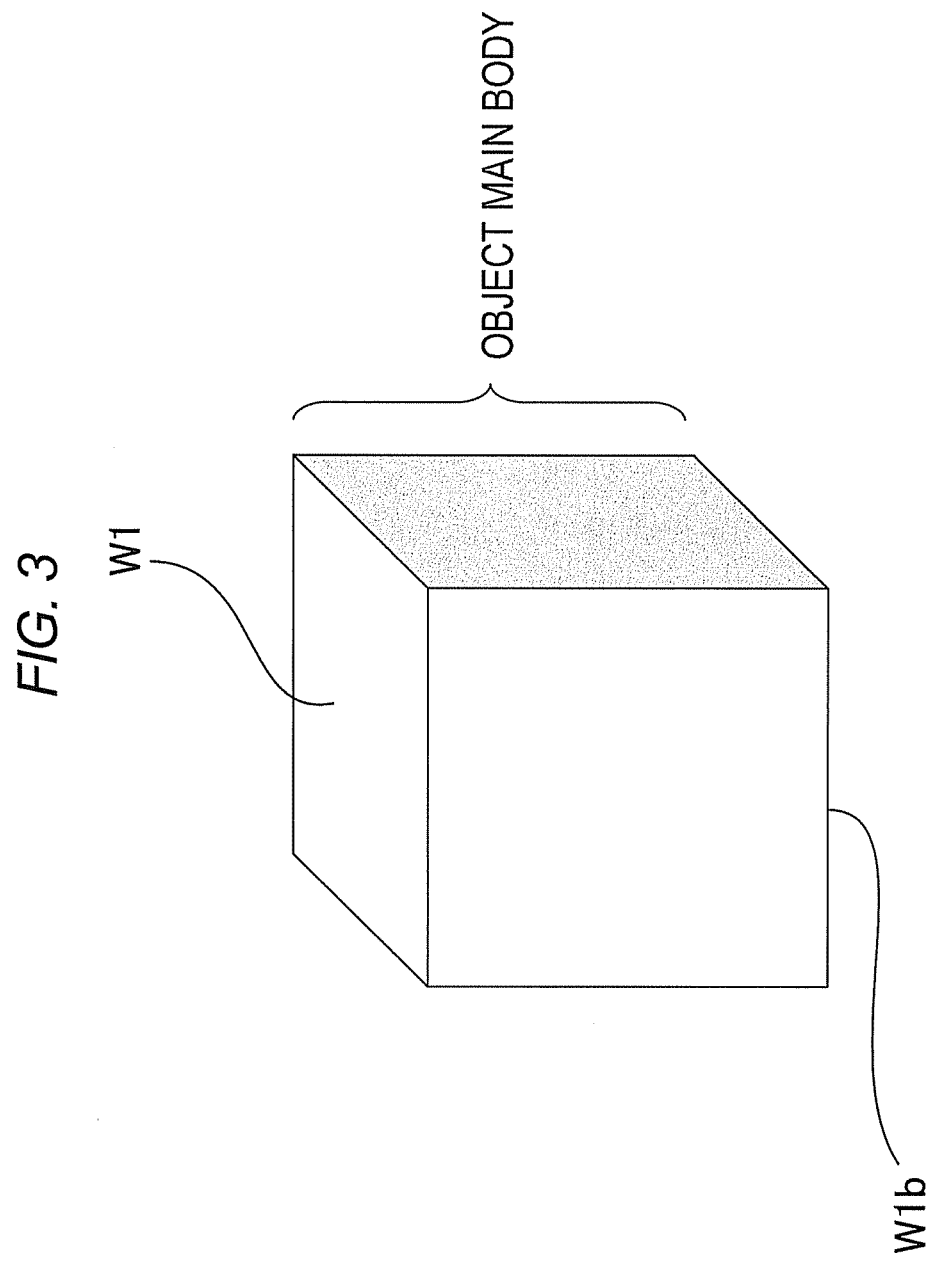
FIG. 3 is a perspective view of an external appearance illustrating an example of a first object used for the present system.

FIG. 3 is a perspective view of an external appearance illustrating an example of the first object used for the present system. Here, an object W1 is, for example, a vehicle, a building, an organism, a product, a natural material, a model which has a three-dimensional geometric shape (for example, a plate, a cylinder, or a hollow shape), or a real object, and a pressing portion W1*t* to be described below is provided on a mounted portion W1*b* thereof.

Specifically, for example, when an object has a certain degree of regularity in terms of a posture while being mounted on the touch panel display, a bottom surface (for example, a supporting surface of a tire of an automobile model or a bottom surface of a glass) while mounting the object with the typical mounted posture can be set as the "mounted portion" herein. In addition, the "mounted portion" herein is not necessarily a "surface" and may be a portion which can be provided with a "pressing portion." Accordingly, even when an installation portion of the object while being mounted with the typical mounted posture is a point or a line (a case where an area of the supporting surface is extremely small like a model of a chair or a doll), a pressing pattern unique to the object at the time of being mounted can be realized by using the installation portion itself as a pressing portion or by providing a pressing portion having a predetermined pattern in a portion with the small installation area.

Figure 4:
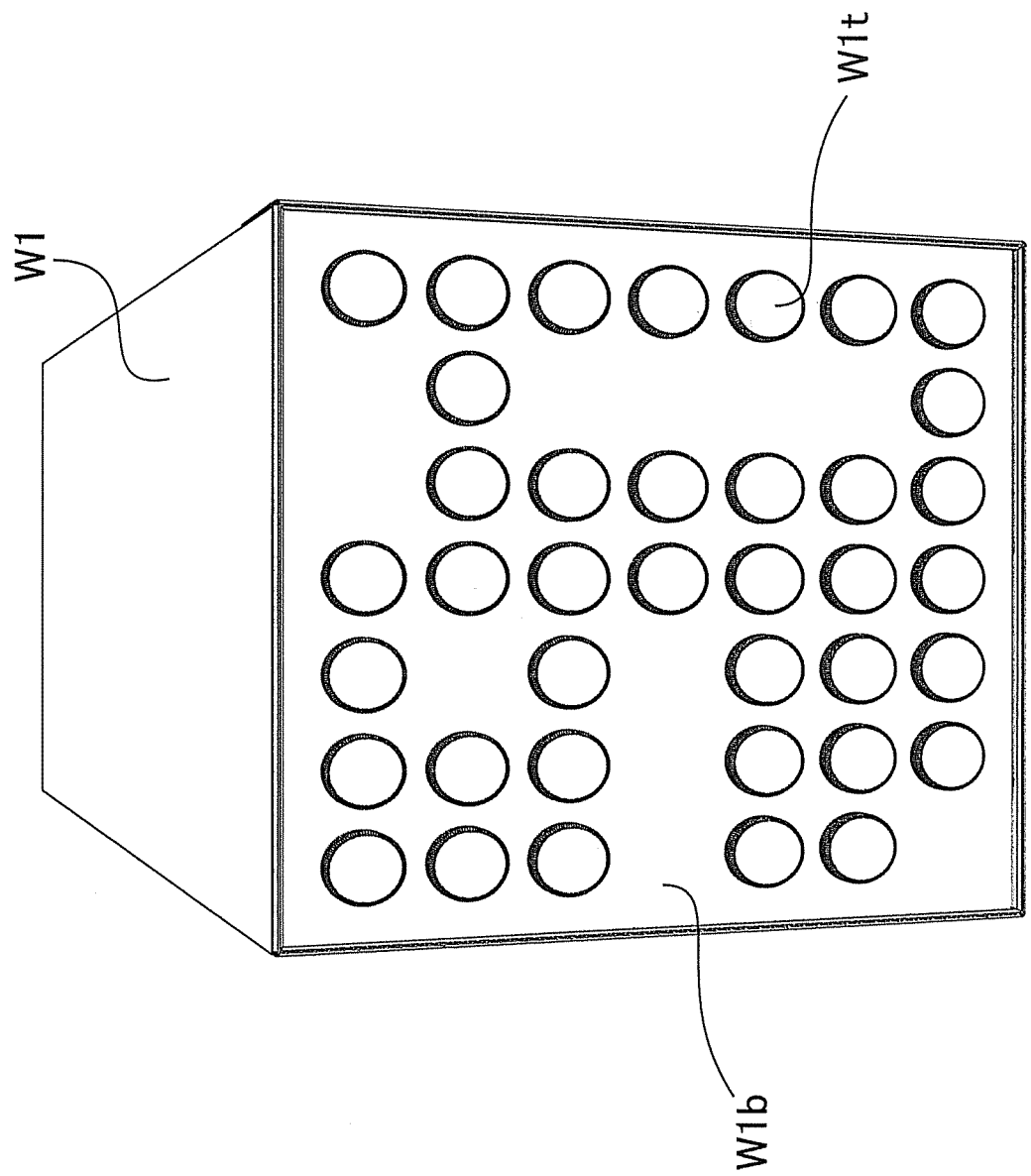
FIG. 4 is a perspective view of an external appearance illustrating an example of a pressing portion that is provided in an object.

FIG. 4 is a perspective view of an external appearance illustrating an example of the pressing portion W1*t* that is provided in the object W1. Here, as an example, a configuration in which a plurality of projections which are each independently provided are adopted and pressing is implemented in a specific pressing pattern on the touch panel display by the overall plurality of projections is exemplified.

The plurality of projections herein are arranged to have a pressing pattern showing identification information in correspondence with an object main body based on a predetermined conversion rule such as a one-dimensional bar code, a two-dimensional bar code, or braille. Accordingly, in regard to an algorithm for obtaining the identification information from the pressing pattern of the pressing portion herein, an arbitrary conversion algorithm can be applied thereto and the algorithm is not limited to the technique exemplified in the present specification.

Furthermore, as long as a multi-touch input to the touch panel display can be performed with the pressing portion W1*t*, the material, the shape, or the size of the object W1 does not matter. For example, it is possible to form a main body of the object W1 with a natural material such as a tree or a stone and provide the pressing portion W1*t* in the lower portion thereof.

In addition, in the pressing portion W1*t* included in the object W1, the shape of the area (pressing pattern) to be pressed while being mounted on the touch panel display 111 is not point-symmetric in a direction of an operation input surface of the touch panel display 111. The expression "a shape which is not point-symmetric" means a shape which is not point-symmetric even when any position in the pressing pattern is set as the center thereof.

Accordingly, when the pressing pattern of the object W1 in the touch panel display 111 is detected, the CPU 801 can determine the orientation of the object W1 being mounted on the touch panel display 111.

Next, a second object W2 will be described.

Figure 5:
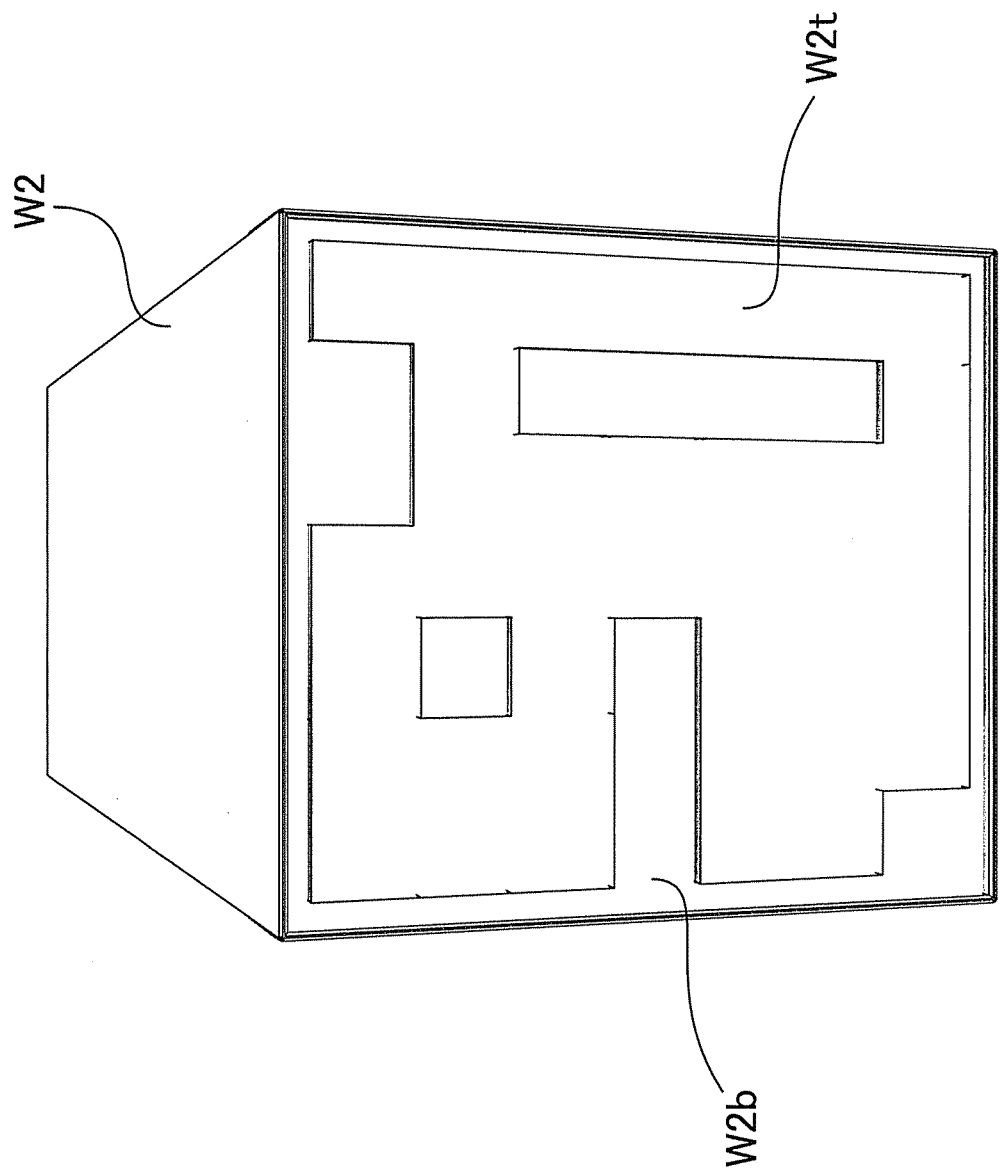
FIG. 5 is a perspective view of an external appearance illustrating an example of a mounted portion of a second object used for the present system.

FIG. 5 is a perspective view of an external appearance illustrating an example of a mounted portion of the second object used for the present system.

The second object W2 according to the present embodiment presses the touch panel display 111 with a pressing portion W2t provided on a mounted portion W2b of an object main body in a predetermined pressing pattern in the same manner as that of the above-described first object W1.

The pressing portion W1t is configured of a plurality of projections in the first object W1 while a predetermined pressing pattern is realized by projections having continuous contour in the second object W2.

Certainly, in regard to the pressing portion W2t included in the object W2, the shape of the area (pressing pattern) to be pressed while being mounted on the touch panel display 111 is not point-symmetric in a direction of an operation input surface of the touch panel display 111.

Accordingly, when the pressing pattern of the object W2 in the touch panel display 111 is detected, the CPU 801 can determine the orientation of the object W2 being mounted on the touch panel display 111.

Also in the case of using the second object W2, in regard to an algorithm for obtaining the identification information from the pressing pattern of the pressing portion W2t, an arbitrary conversion algorithm can be applied thereto.

Next, a third object W3 will be described.

Figure 6:
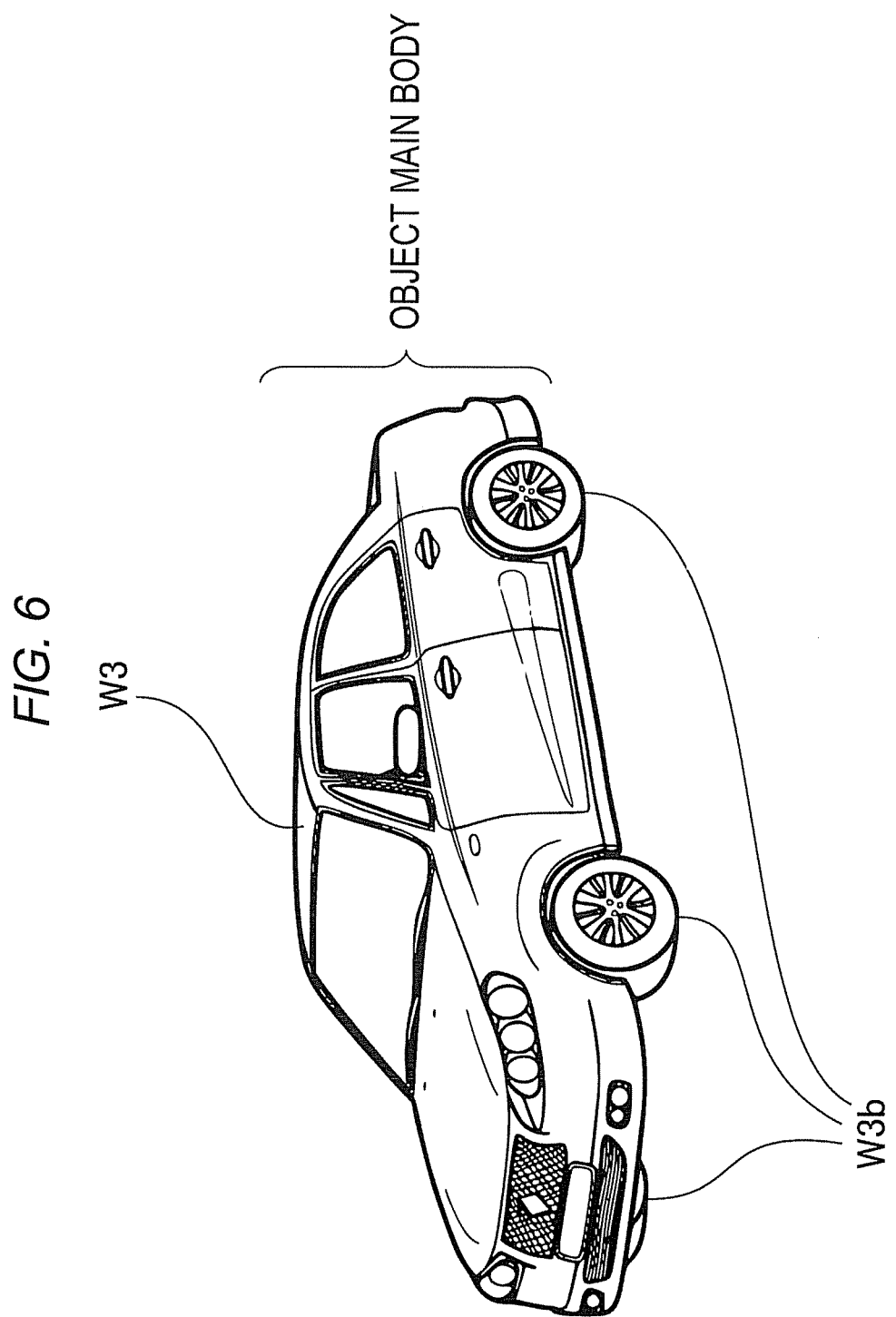
FIG. 6 is a perspective view of an external appearance illustrating an example of a third object used for the present system.
Figure 7:
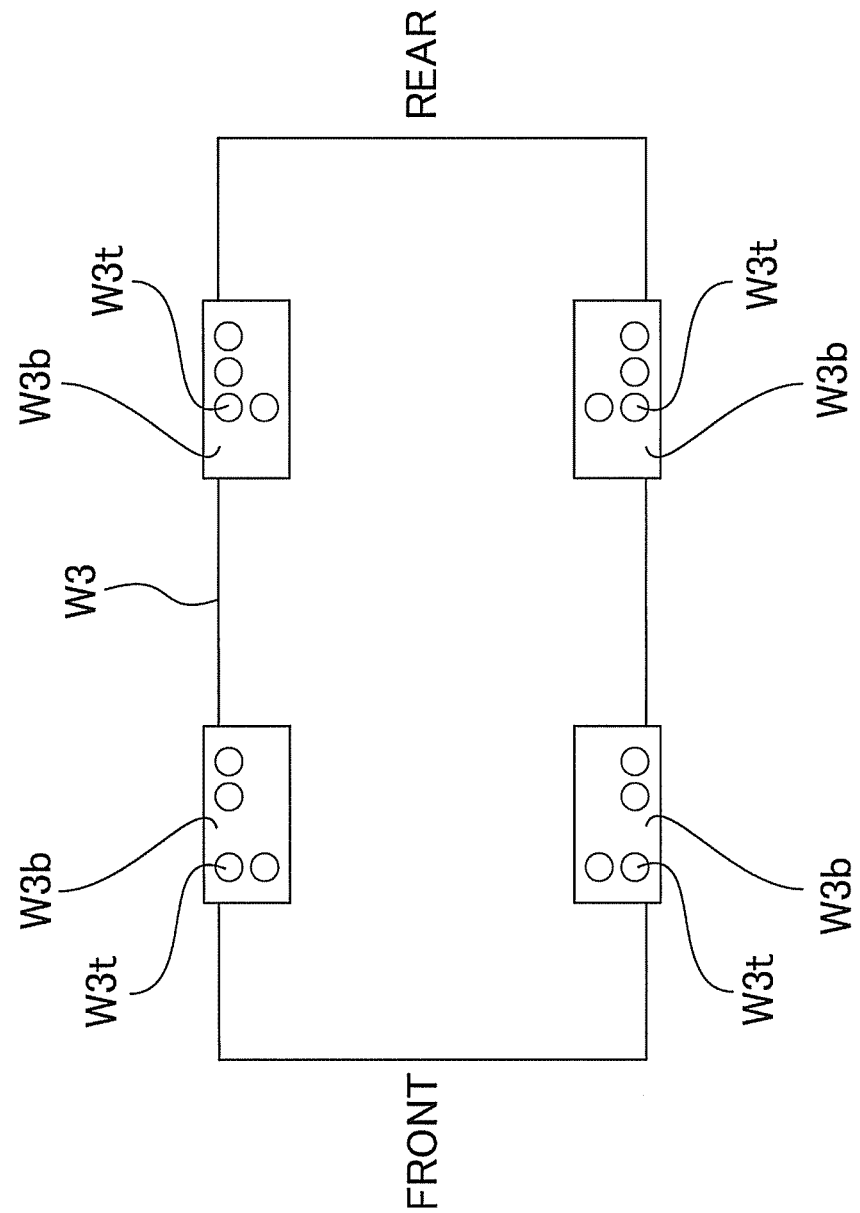
FIG. 7 is a bottom view illustrating an example of a mounted portion of the third object.

FIG. 6 is a perspective view of an external appearance illustrating an example of the third object used for the present system and FIG. 7 is a bottom view illustrating an example of a mounted portion of the third object.

The third object W3 in the present embodiment presses the touch panel display 111 with the pressing portion provided on the mounted portion of an object main body in a predetermined pressing pattern in the same manner as that of the first object W1 described above.

The pressing portion W1t is formed on the bottom surface of the box-like object main body in the first object W1, but since a model of an automobile is formed as the object main body in the third object W3, pressing portions W3t are provided in portions (the mounted portion W3b) corresponding to the bottom surfaces of tires of the object main body, and accordingly, pressing patterns are formed by the pressing portions W3t of all four tires.

In addition, the pressing patterns of the pressing portions W3t provided in the respective tires have unique shapes different for each tire, so it is possible to identify to which tire the pattern of the pressing portion W3 corresponds based on the respective pressing patterns.

Accordingly, in the pressing portion W3t included in the object W3, similarly, the shape of the area (pressing pattern) to be pressed while being mounted on the touch panel display 111 is not point-symmetric in a direction of an operation input surface of the touch panel display 111.

In this manner, when the pressing patterns of the object W3 in the touch panel display 111 are detected, the CPU 801 can determine the orientation of the object W3 being mounted on the touch panel display 111. Furthermore, the CPU 801 can grasp the positions of the respective four tires.

Also in the case of using the third object W3, in regard to an algorithm for obtaining the identification information from the pressing pattern of the pressing portion W3t, an arbitrary conversion algorithm can be applied thereto.

Next, a fourth object W4 will be described.

Figure 8:
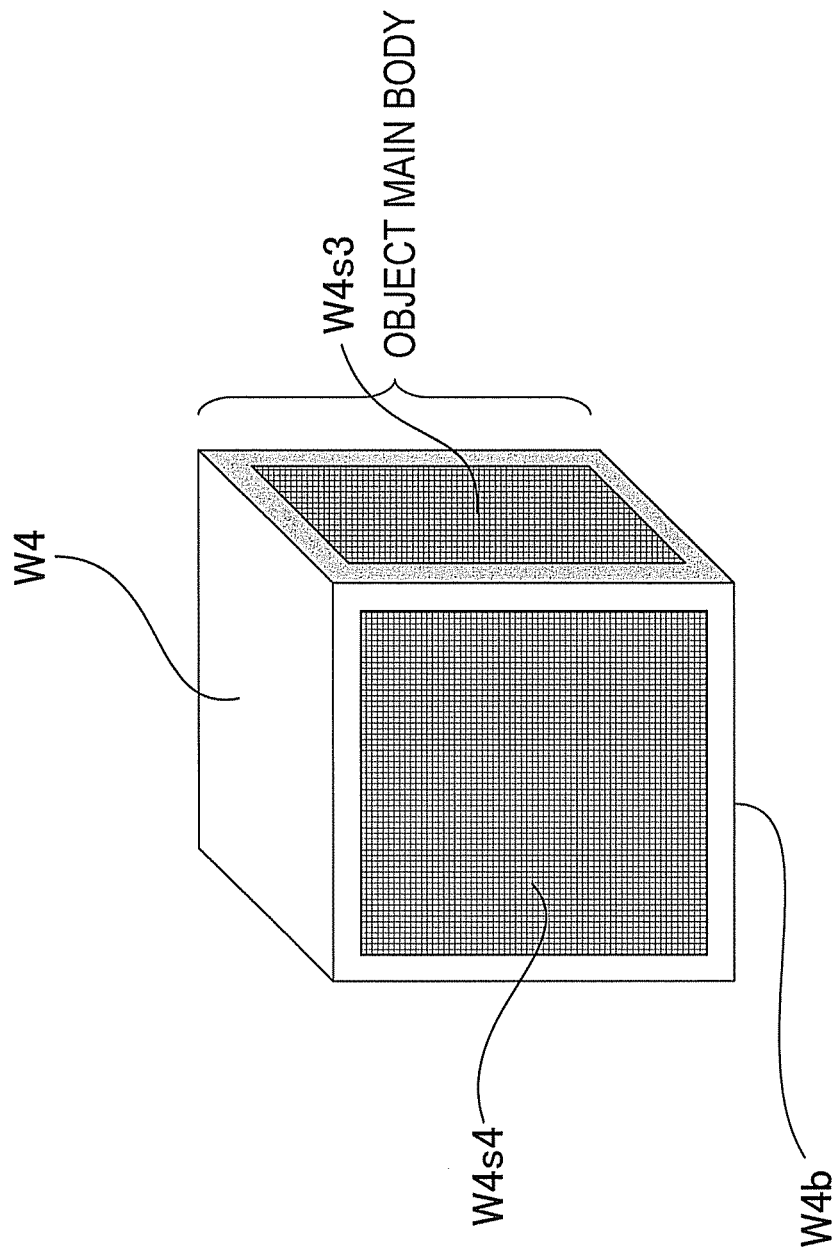
FIG. 8 is a perspective view of an external appearance illustrating an example of a fourth object used for the present system.
Figure 9:
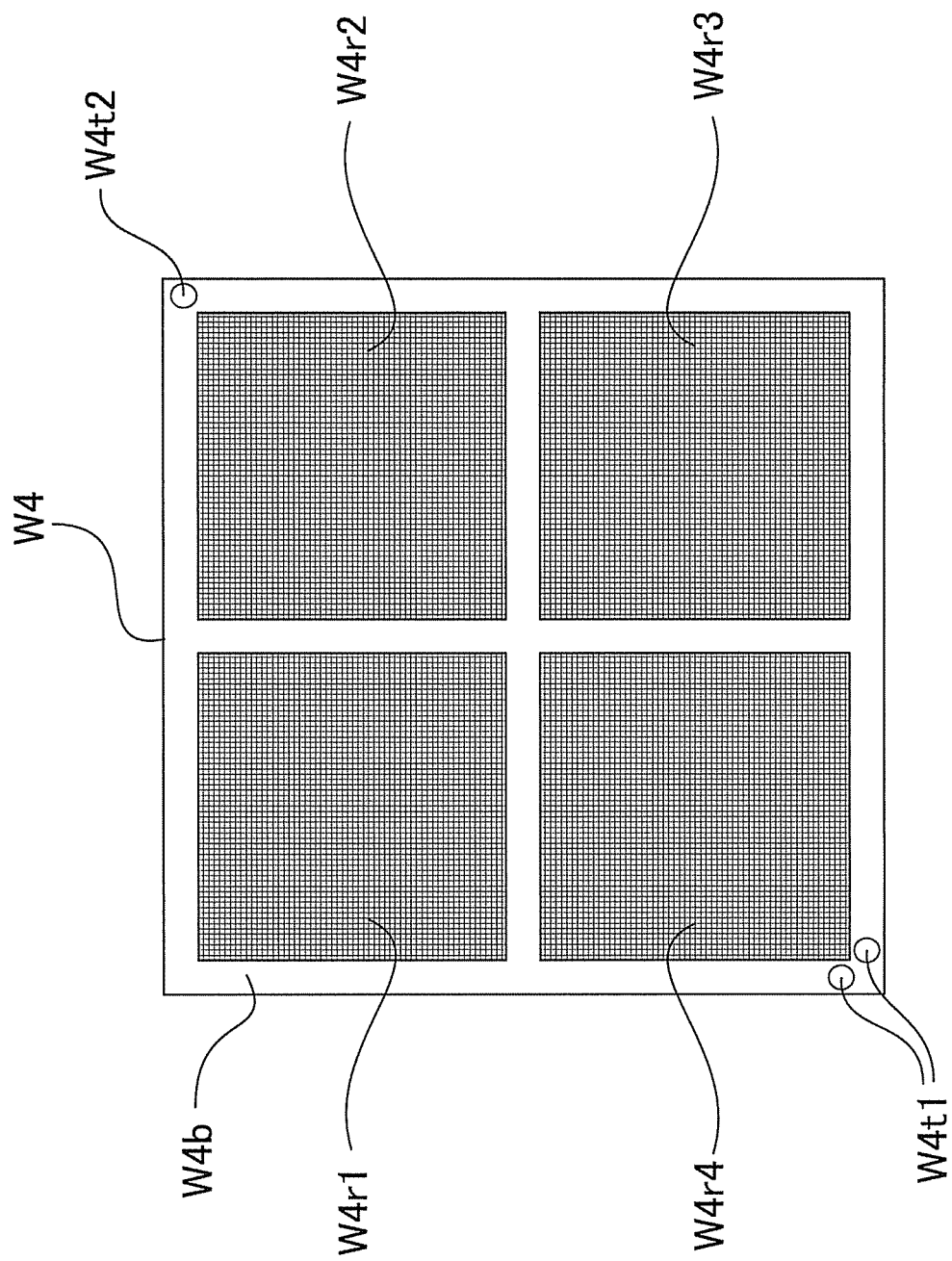
FIG. 9 is a bottom view illustrating an example of a mounted portion of the fourth object.

FIG. 8 is a perspective view of an external appearance illustrating an example of the fourth object used for the present system. FIG. 9 is a bottom view illustrating an example of a mounted portion of the fourth object.

The fourth object W4 in the present embodiment includes a light guiding unit that receives the light of an image displayed on a display of the touch panel display 111 and projects the light on a predetermined area on an object main body in addition to the pressing portion configured of the plurality of projections as in the above-described first object W1.

Pressing portions W4t1 and W4t2 formed on a mounted portion W4b which is the bottom surface of the object W4 are arranged diagonally and the pressing patterns have unique shapes which are different from each other.

Also in the case of using the fourth object W4, in regard to an algorithm for obtaining the identification information from the pressing patterns of the pressing portions W4t1 and W4t2, an arbitrary conversion algorithm can be applied thereto.

Accordingly, when the pressing patterns of the object W4 in the touch panel display 111 are detected, the CPU 801 can determine the orientation of the object W4 being mounted on the touch panel display 111.

Furthermore, the object W4 includes, for example, four light receiving areas W4r1 to W4r4 on the bottom surface thereof and light guiding units W4/1 to W4/4 that project light (image) received in the respective light receiving areas W4r1 to W4r4 on predetermined projection areas W4s1 to W4s4 which are different from the light receiving areas in the object main body.

Figure 10:
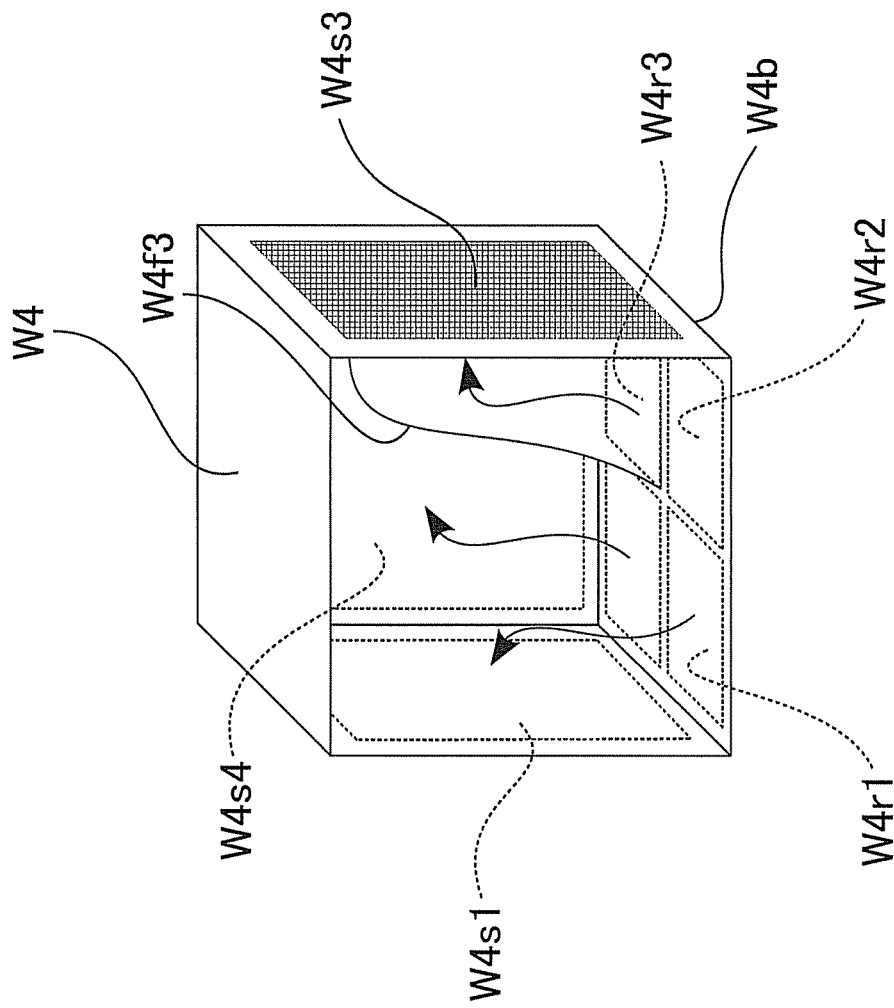
FIG. 10 is a conceptual view for describing an internal structure of an object.

FIG. 10 is a conceptual view for describing an internal structure of the object W4. In addition, for convenience of description, only the light guiding unit W4/3 is illustrated herein and the light guiding units W4/1, W4/2, and W4/4 are omitted from the drawing.

The respective light guiding units W4/1 to W4/4 are configured of optical elements such as a bundle of optical fibers or a mirror, and guide the light received in the light receiving areas W4r1 to W4r4 to the corresponding projection areas W4s1 to W4s4 respectively.

Accordingly, in the area on which the object W4 is mounted on the touch panel display 111, when a screen area corresponding to the light receiving area W4r1 is determined based on the pressing portions W4t1 and W4t2 and a desired image (for example, a rectangle image) is displayed on the screen area, the light of the rectangle image is guided to the projection area W4s1 by the light guiding unit W4/1 through the light receiving area W4r1.

As a result, the user can visually recognize a state in which the rectangle image displayed on the above-described screen area on the touch panel display 111 is projected on the projection area W4s1 which is on the side surface of the object main body of the object W4.

Next, a fifth object W5 will be described.

Figure 11:
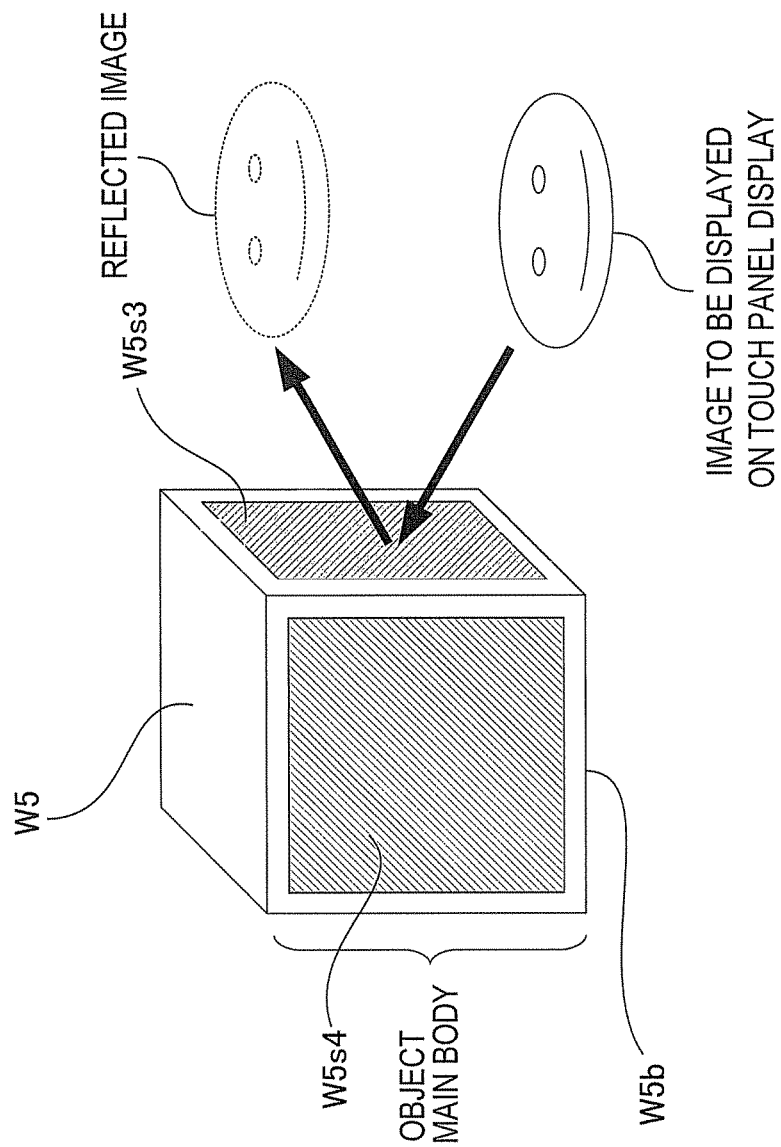
FIG. 11 is a perspective view of an external appearance illustrating an example of a fifth object used for the present system.

FIG. 11 is a perspective view of an external appearance illustrating an example of the fifth object used for the present system.

In the fifth object W5, a pressing portion configured of a plurality of projections for recognizing the mounting direction of the mounted object is formed on the bottom surface (mounted portion W5b) of an object main body in the same manner as that of the fourth object W4.

Furthermore, reflection surfaces W5s1 to W5s4, for allowing the user to visually recognize light by reflecting the light (image) to be displayed on the touch panel display 111, are provided on four side surfaces of the object main body of the fifth object W5.

Moreover, here, an example in which reflection surfaces are formed on substantially the entire surfaces of the respective four side surfaces of the object main body is exemplified, but, for example, the reflection surfaces can be formed on at least a part of the area of any of the side surfaces without being limited thereto.

The CPU 801 can allow an image to be reflected at an arbitrary angle with respect to an arbitrary reflection surface from among the reflection surfaces W5s1 to W5s4 by determining the orientation of the object W5 being mounted based on the pressing pattern of the pressing portion on the bottom surface of the object W5.

Next, a sixth object W6 will be described.

Figure 12:
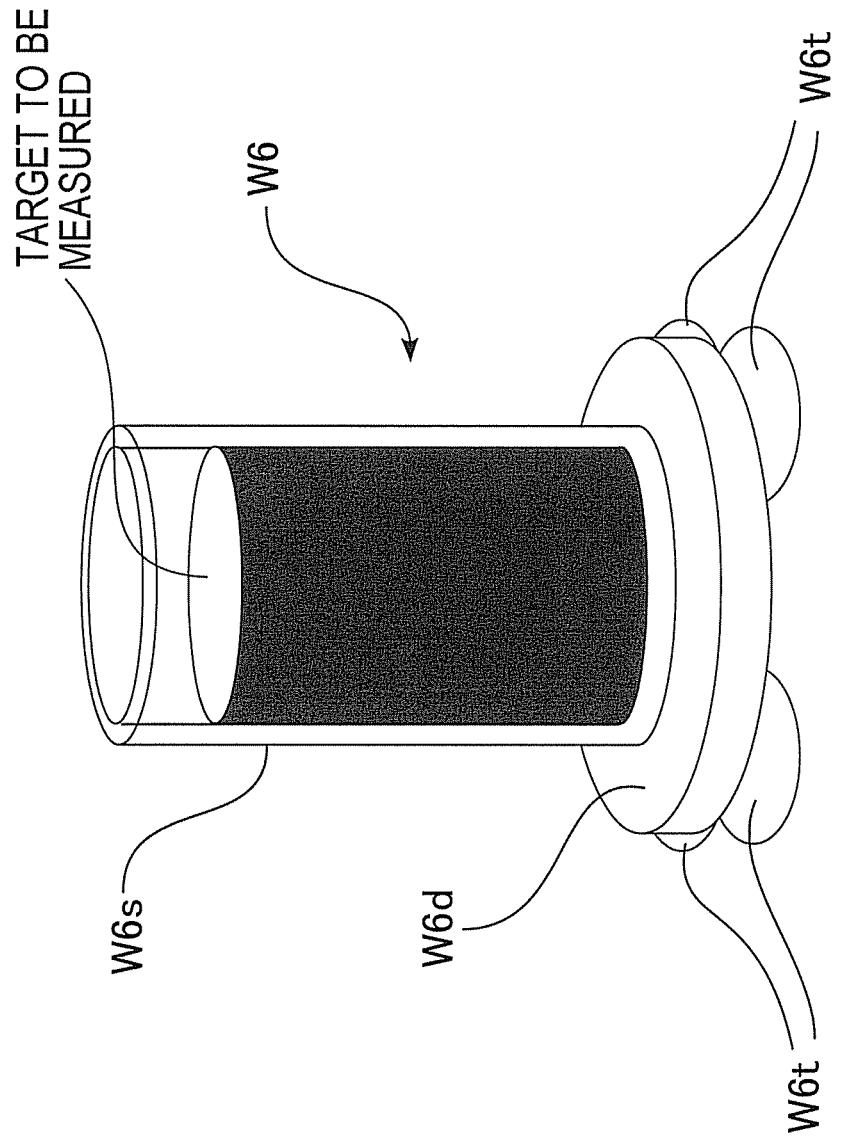
FIG. 12 is a perspective view of an external appearance illustrating an example of a sixth object used for the present system.
Figure 13:
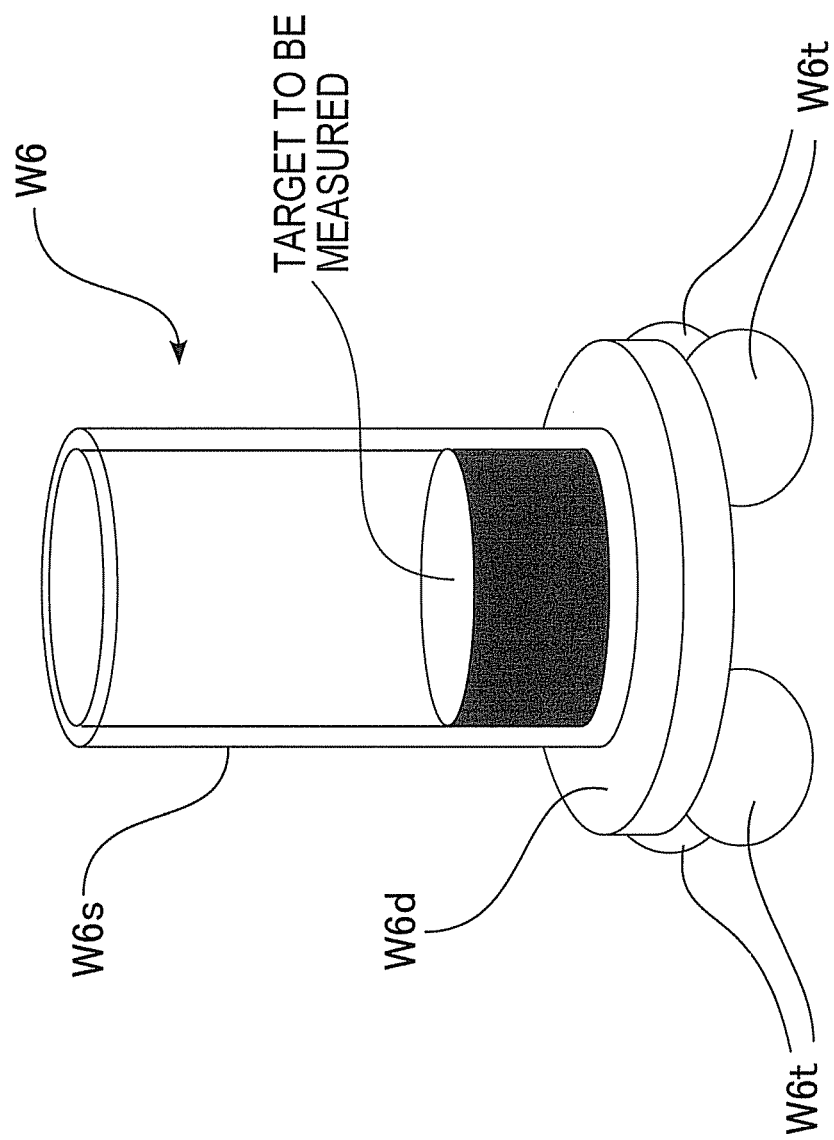
FIG. 13 is a perspective view of an external appearance illustrating an example of the sixth object.

FIGS. 12 and 13 are perspective views of an external appearance illustrating an example of the sixth object used for the present system.

The sixth object W6 includes four elastic members W6t including rubber or a spring on the bottom surface (mounted portion) of an object main body. Here, for example, the object main body of the sixth object W6 is configured of a glass W6s and a base W6d. Consequently, here, the bottom surfaces of the four elastic members W6t have roles as pressing portions.

By such a configuration, when a liquid such as a drink is poured into the glass W6s of the sixth object W6, the weight of the object main body is increased, the four elastic members W6t supporting the object main body are pressed down so as to be elastically deformed, and the contact area between the bottom surface of the elastic member W6t and the surface of the touch panel display is increased.

In contrast, when the liquid of the glass W6s of the sixth object W6 is decreased, the weight of the object main body is decreased, the strength of pressing down the four elastic members W6t which support the object main body becomes small, and the contact area between the bottom surface of the elastic member W6t and the surface of the touch panel display is decreased.

Figure 14:
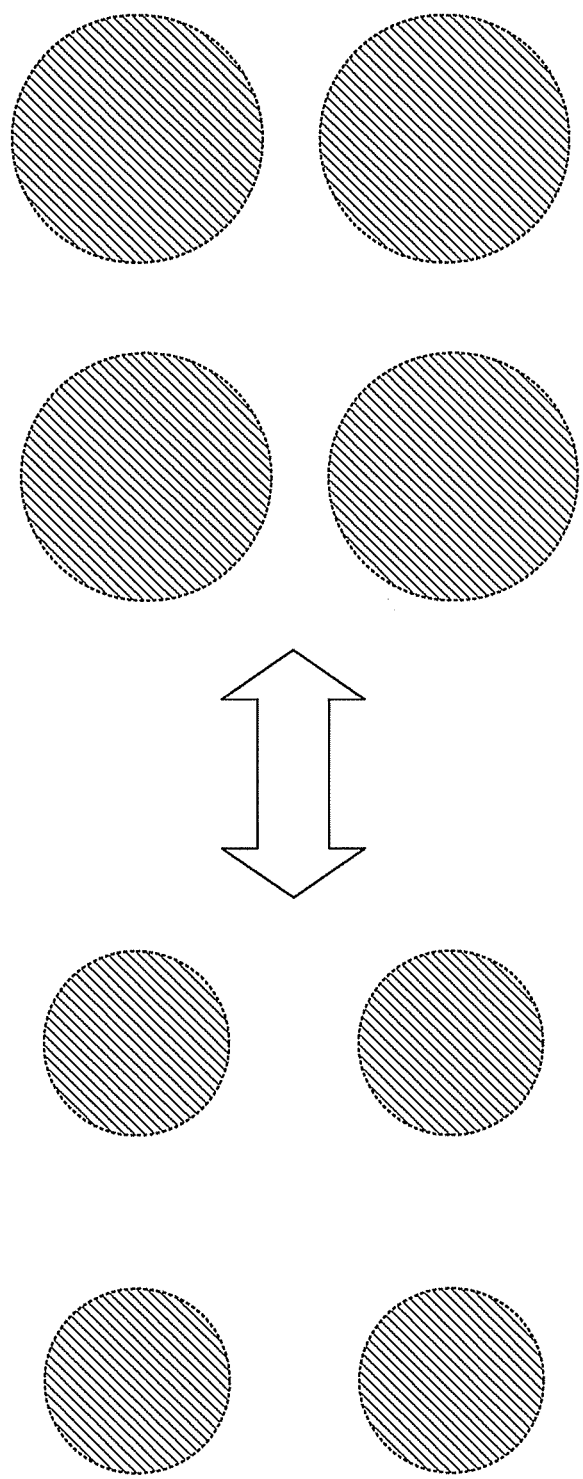
FIG. 14 is a conceptual view illustrating a situation of fluctuation of a contact area between a bottom surface of an elastic member and a surface of a touch panel display.

FIG. 14 is a conceptual view illustrating a situation of fluctuation of the contact area between the bottom surface of the elastic member W6t and the surface of the touch panel display, due to an increase or decrease in the liquid in the glass W6s of the sixth object W6.

Figure 15:
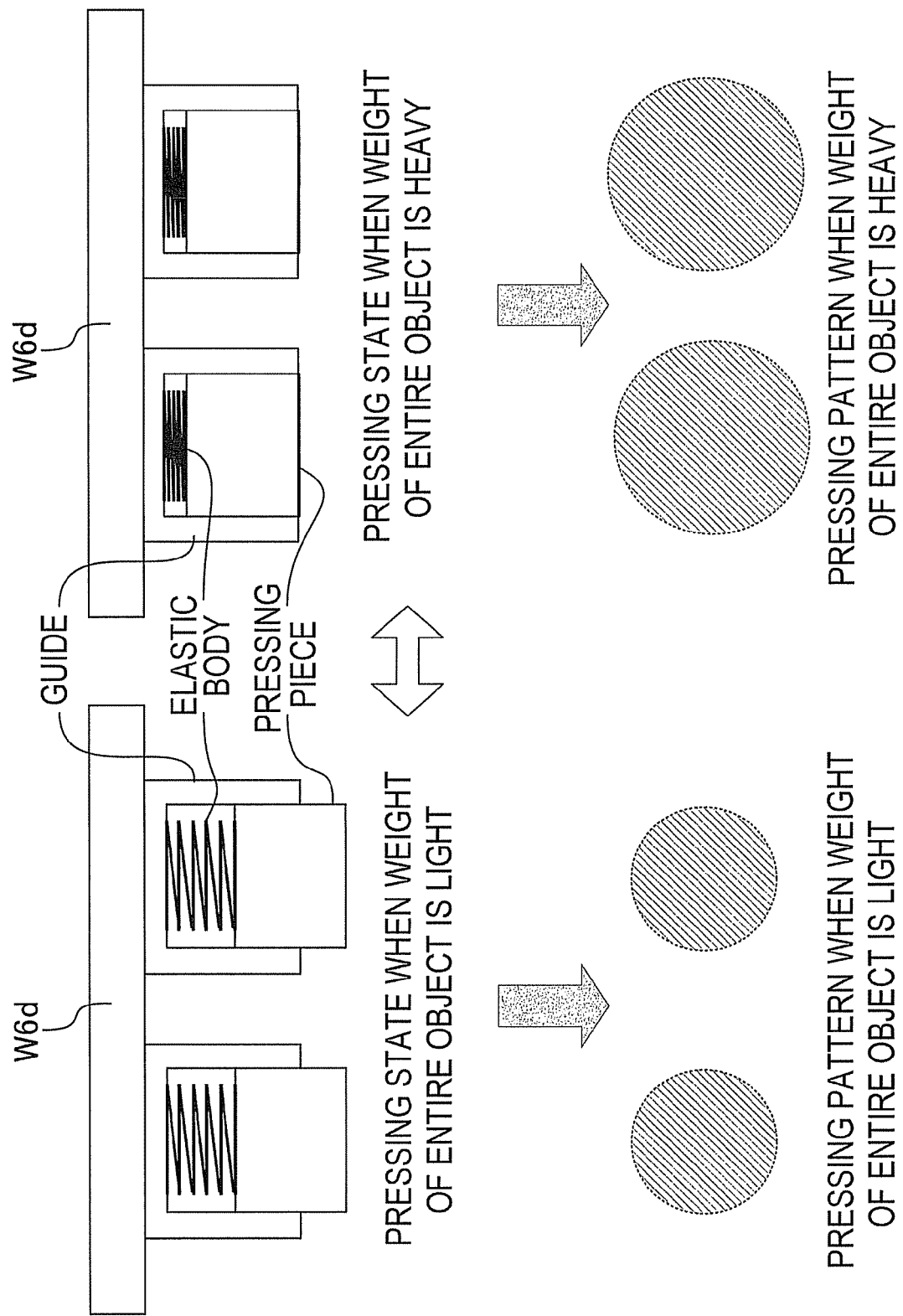
FIG. 15 is a conceptual view illustrating a modified example of the elastic member included in the sixth object.

FIG. 15 is a conceptual view illustrating a modified example of the elastic member W6t included in the sixth object W6.

As shown in FIG. 15, the elastic member W6t can be configured of a guide, a pressing piece, or an elastic body such as a compressing spring. In this case, when the weight of the entire object is light, only a bottom portion of the pressing piece comes into contact with the touch panel display because the pressing piece is projected by the action of the elastic body. In contrast, when the weight of the entire object is heavy to the extent that the pressing piece is completely buried in the guide, both of the bottom portion of the pressing piece and a bottom surface of the guide come into contact with the touch panel display.

In such a configuration, the change in the contact area according to the change in weight of the object main body can be shown in only two stages, but it is obvious that the change in the contact area can be shown in three stages or more by employing the configuration shown in FIG. 15 in multiple stages.

In addition, in another object having the pressing portion configured of the above-described projections, the pressing pattern and the change in the contact area according to the change in weight can both be realized by forming the projections with elastic members.

Furthermore, in the first to sixth objects described above, configurations of providing pressing portions are employed for realizing predetermined pressing patterns, but a portion which can press the touch panel in a desired pressing pattern when mounting the object on the touch panel display can be regarded as a "pressing portion" without being necessarily limited to projection groups arranged in a predetermined arrangement pattern.

Operation Description

Next, processing in the interface system according to the present embodiment will be described.

Figure 16:
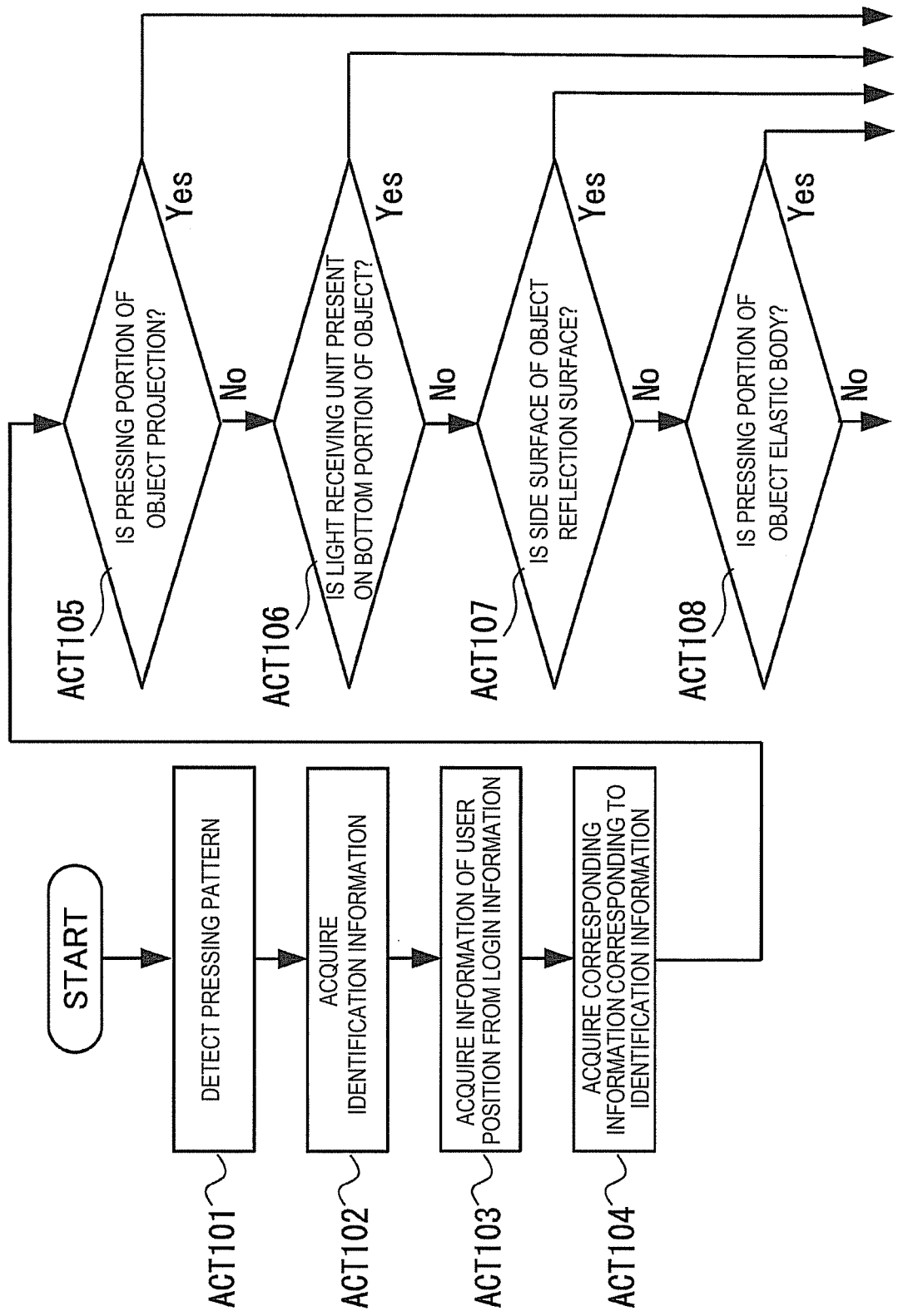
FIG. 16 is a flowchart illustrating a flow of processing in the interface system.
Figure 17:
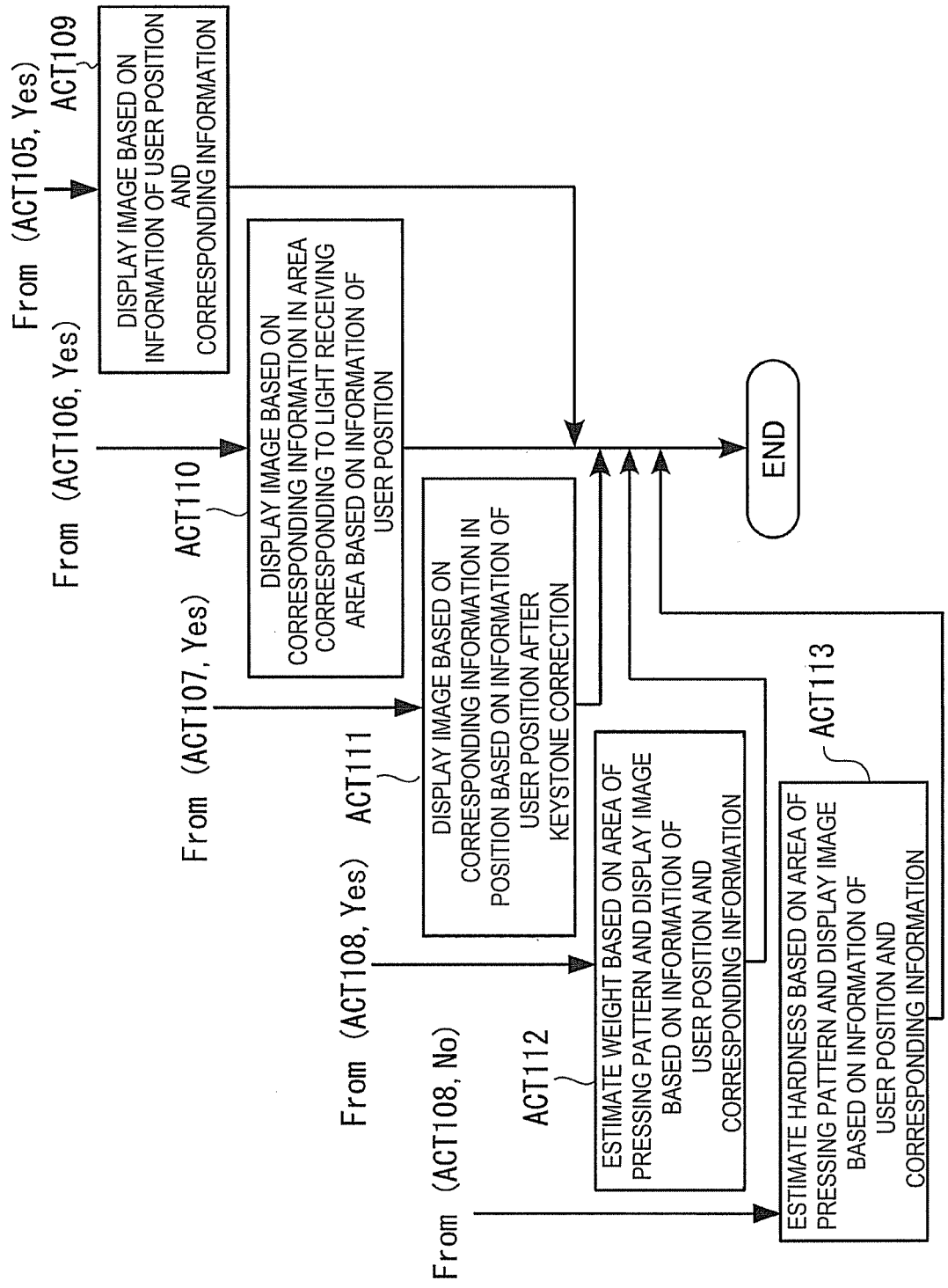
FIG. 17 is a flowchart illustrating a flow of processing in the interface system.

FIGS. 16 and 17 illustrate a flowchart showing a flow of processing in the interface system according to the present embodiment. The flowchart is shown by being divided for want of space, but FIGS. 16 and 17 both illustrate one flowchart.

When an object arbitrarily selected from among various kinds of objects as described above is mounted on a screen of the touch panel display 111 as a desired object by the user, the pressing portion provided on the mounted portion of the object presses the operation surface of the touch panel display 111 in a predetermined pressing pattern.

The CPU 801 (pattern detecting unit) detects the pressing pattern of the pressing portion of the object mounted on the touch panel display 111 (ACT 101).

The CPU 801 (identification information acquisition unit) acquires specific information from the detected pressing pattern and acquires the information as the identification information of the object mounted on the touch panel display 111 based on the above-described predetermined conversion algorithm (ACT 102).

Subsequently, the CPU 801 acquires information indicating a positional relationship between the user and the touch panel display 111 of the communication table C based on the result of detection in the human detection sensor 806 or the result of user authentication on the touch panel display 111 (ACT 103).

As information indicating the user position, information specifically indicating a position or a coordinate is preferable, but the information may be approximate position information such as "which chair is the user sitting on?" or "which side of the touch panel display is the user operating?" in some cases in regard to processing in which a requested precision on the position information of the user is low.

Next, the CPU 801 refers to, for example, a data table as shown in FIGS. 18 and 19 which is stored in the storage 803 and acquires corresponding information in correspondence with the identification information acquired based on the pressing pattern (ACT 104).

Figure 20:
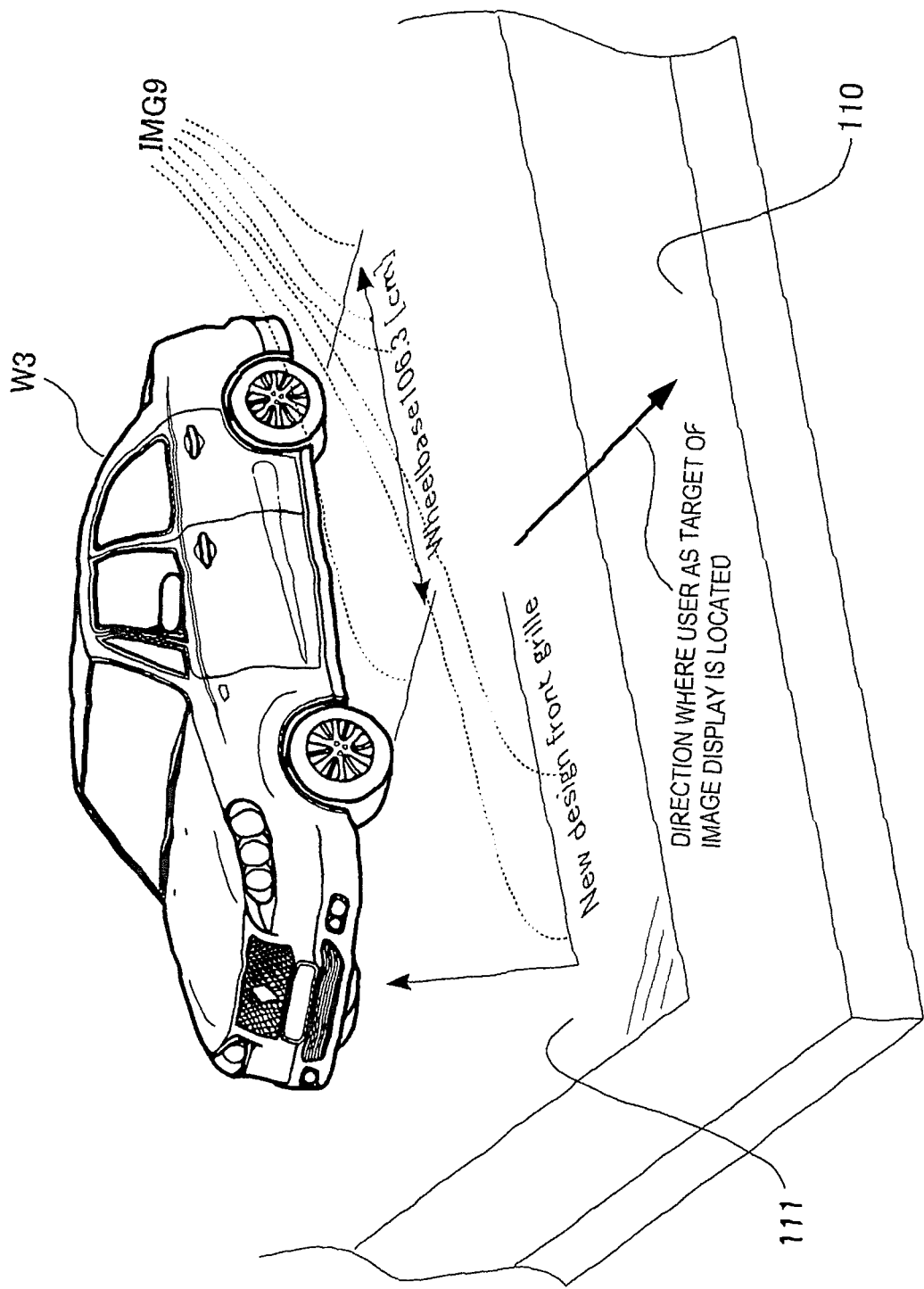
FIG. 20 is a view illustrating a display example on a display.

Subsequently, the CPU 801 determines which object is mounted on the touch panel display 111 among a plurality of kinds of objects as described above based on the identification information acquired based on the pressing pattern (ACTs 105 to 108). The determination of the types of the objects herein can be performed based on, for example, information registered to the data table shown in FIGS. 18 and 19. For example, as shown in FIG. 18, when the identification information obtained by changing the detection result of the pressing pattern is "2345," the type of object can be determined as a "projection type." When the type of object being mounted on the touch panel display 111 is a "projection type pressing portion" (object W3) (ACT 105, Yes), the CPU 801 (display control unit) allows, an image based on information (Wheelbase or the like) acquired as the identification information of the object being mounted on the touch panel display 111, to be displayed in correspondence with the area being pressed by the pressing portion of the object on the touch panel display 111 (FIG. 20). The "image" herein is not necessarily limited to a color, a figure, a photo, or the like, and can include, for example, characters or symbols indicating product information or the like.

Furthermore, pressing patterns individually unique to respective tires are provided to the object W3 identified herein, and thus the positions of the tires can be grasped.

Accordingly, the CPU 801 (pattern detecting unit) can determine the orientation of the object being mounted on the touch panel display 111 in the direction of the operation input surface of the touch panel display 111 based on the pressing pattern to be detected. Not only can identification of the object be obtained by the pressing pattern, but also detection of the orientation of the object being mounted on the touch panel display is possible by setting the shape of the pressing portion on the bottom surface of the object to be not point-symmetric in the direction of the operation input surface of the touch panel.

The CPU 801 can display correspondence information to be acquired on the touch panel display 111 in an optimal arrangement according to the position of the tire or the orientation of the automobile if necessary (ACT 109). Certainly, when the information is displayed on a screen, it is desirable to display information (top and bottom of characters or the like) in consideration of visibility of the information seen by the user in addition to the positional relationship of the information and the object.

When the type of the object being mounted on the touch panel display 111 is "light guiding type" (object W4) (ACT 106, Yes), the CPU 801 (display control unit) allows, an image corresponding to the identification information which is information indicated by the pressing pattern to be detected, to be displayed in a screen area corresponding to the light receiving area in the touch panel display 111 (ACT 110).

Certainly, the CPU 801 (display control unit) can allow a desired image to be displayed on the screen area corresponding to a desired area in the plurality of light receiving areas $W4r1$ to $W4r4$ based on information indicating the acquired user position.

By adopting such a configuration, an image can be selectively projected on an arbitrary area in a plurality of projection areas to be set in the object according to an area for displaying the image corresponding to any one of the plurality of light receiving areas provided on the bottom surface of the object.

Moreover, here, a case in which the plurality of projection areas are flat side surfaces of the cube-shaped object is exemplified, but, without being limited thereto, a surface of a hood and a surface of a door can be used as projection areas which are different from each other in an automobile type of object and desired images can be projected thereon individually.

The images to be actually projected on respective projection areas may be set by the data table as shown in FIGS. 18 and 19 in advance or may be arbitrarily set by an operation by the user on the touch panel display 111. Certainly, the image to be projected can be used as an image in correspondence with the user to visually recognize the image based on rules set on the data table.

When the type of object being mounted on the touch panel display 111 is a "reflection type" (object W5) (ACT 107, Yes), the CPU 801 (display control unit) allows, the image corresponding to the identification information which is information indicated by the pressing pattern to be detected, to be displayed in a screen area corresponding to the reflection surface of the object in the touch panel display 111 and allows the image to be visually recognized by the user by reflecting the image on the reflection surface of the object (ACT 111).

Specifically, the CPU 801 (display control unit) specifies the position of the user to visually recognize the reflected image from the reflection surface with respect to the touch panel display 111 based on the information indicating the user position acquired, and allows a desired image to be displayed on the screen area corresponding to a desired area in the plurality of reflection surfaces $W5s1$ to $W5s4$ after keystone correction. When information related to the height of the eye level of the user can be acquired based on the authentication information or the like of the user to visually recognize the reflected image, it is preferable to perform keystone correction in consideration of the information.

Figure 21:
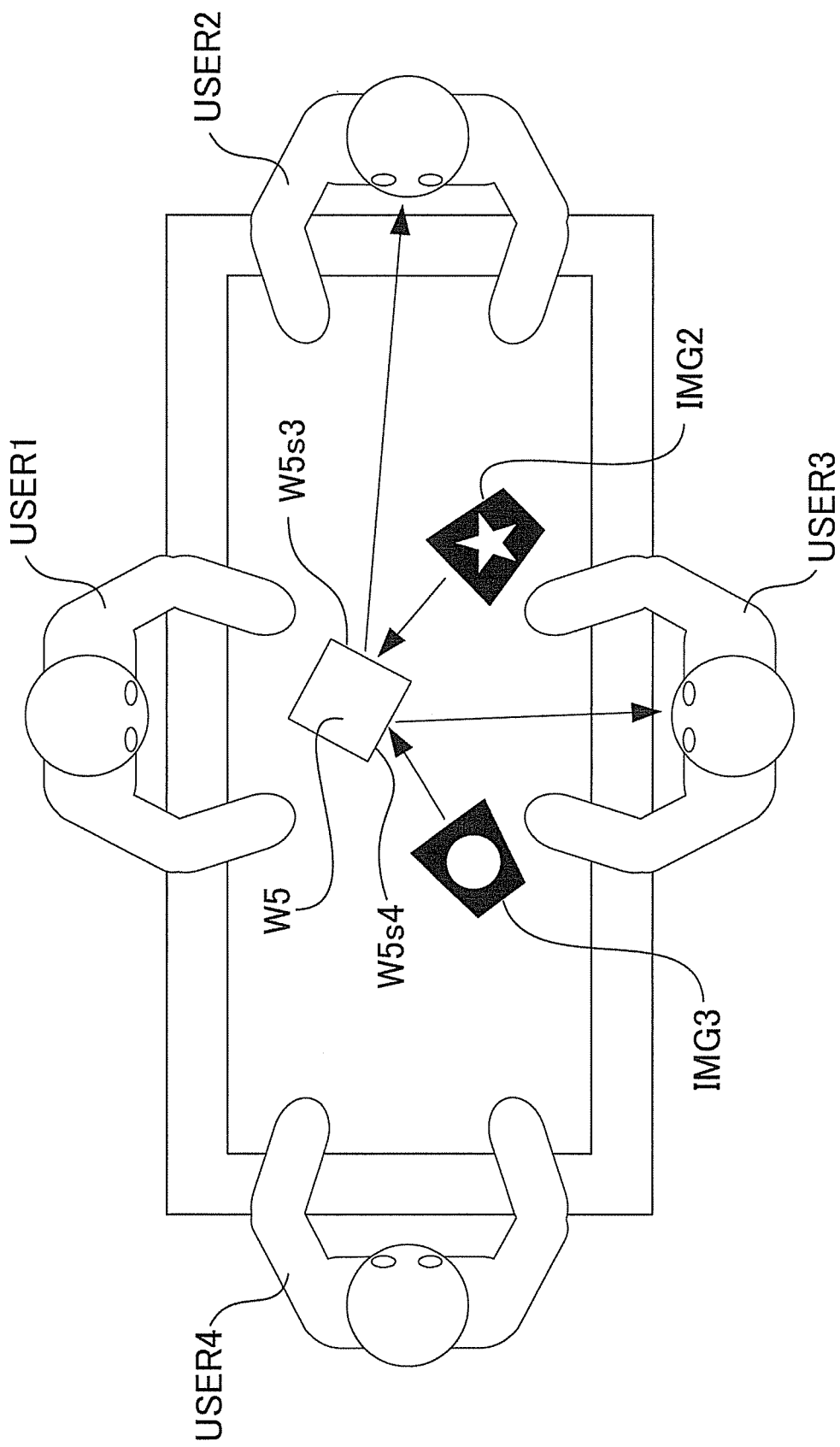
FIG. 21 is a view illustrating an example in which images to be visually recognized by different individual users are individually displayed with respect to respective reflection surfaces of an object.
Figure 22:
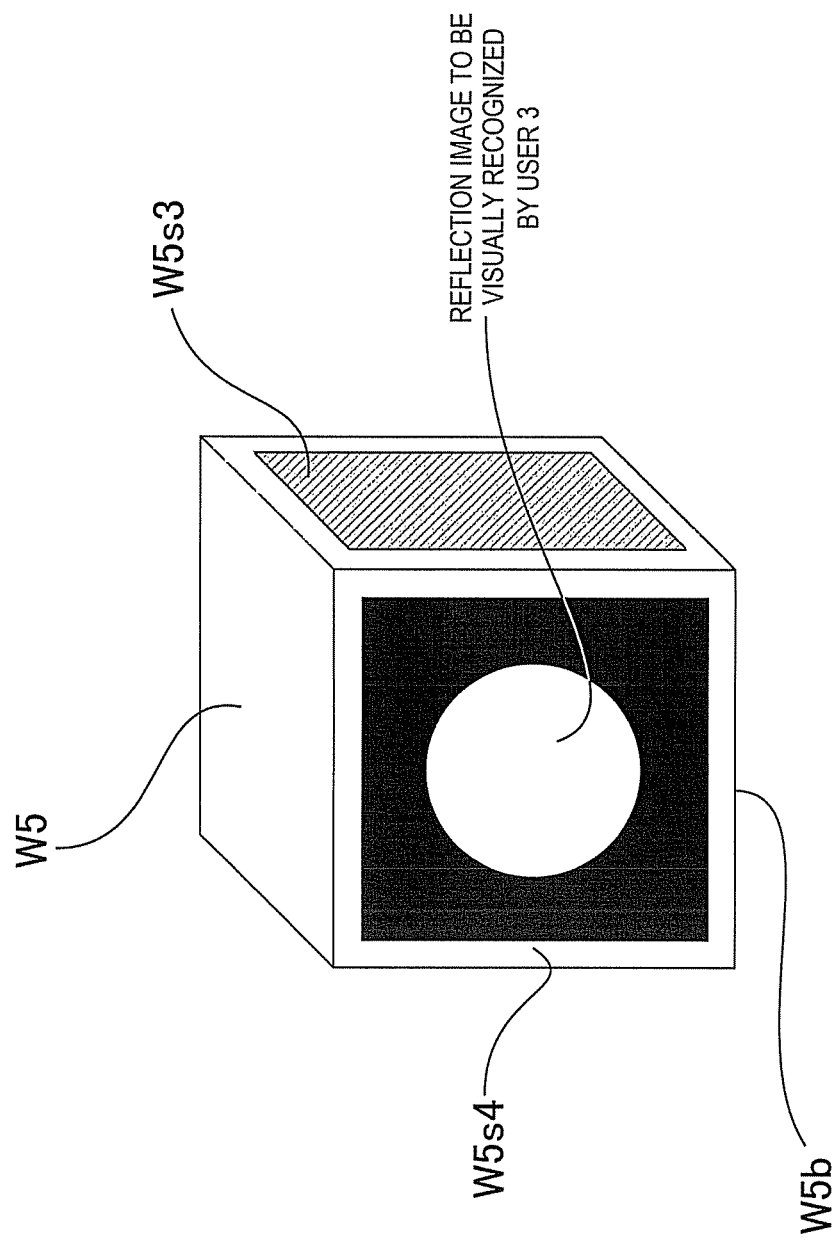
FIG. 22 is a view illustrating an example of an image visually recognized by a user as a result of performing image, display as shown in FIG. 21.

FIG. 21 is a view illustrating an example in which images (an IMG 2 and an IMG 3) to be visually recognized by different individual users (a USER 2 and a USER 3) are individually displayed with respect to respective reflection surfaces of the object W5. FIG. 22 is a view illustrating an example of an image visually recognized by the USER 3 as a result of performing image display as shown in FIG. 21.

The image reflected on respective reflection surfaces may be set by the data table as shown in FIGS. 18 and 19 in advance, or may be arbitrarily set by an operation by the user on the touch panel display 111.

When the type of the object being mounted on the touch panel display 111 is an "elastic body type pressing portion" (object W6) (ACT 108, Yes), the CPU 801 (weight determining unit) determines the weight of the object being mounted on the touch panel display 111 based on the contact area in the pressing pattern to be detected (ACT 112).

Furthermore, in regard to a relationship between the contact area [mm$^2$] of the pressing pattern of the pressing portion and the weight [g], a corresponding table corresponding to the respective objects or a function for an arithmetic operation is stored in the storage 803 or the like in advance. FIG. 23 is a data table illustrating an example of the relationship between the weight and the contact area of the pressing pattern of the pressing portion.

In addition, the CPU 801 (hardness determining unit) can determine the hardness of the pressing portion in contact with the touch panel display 111 of the object by applying a technology of weight estimation based on the contact area of the pressing pattern.

Furthermore, when the type of the object being mounted on the touch panel display 111 does not correspond to any of the plurality of kinds of objects as described above (ACT 108, No), the CPU 801 (weight determining unit) determines the hardness of the object being mounted on the touch panel display 111 based on the contact area in the pressing pattern to be detected (ACT 113).

Furthermore, in regard to a relationship between the contact area [mm$^2$] of the pressing pattern of the pressing portion and the hardness [kgf/cm$^2$], a corresponding table corresponding to respective objects or a function for an arithmetic operation is stored in the storage 803 or the like in advance. FIG. 24 is a data table illustrating an example of a relationship between the hardness and the contact area with the touch panel display 111 of a frozen object.

For example, when an "object whose shape is changed by being defrosted" such as frozen fish, meat, or vegetable is mounted on the touch panel display 111, the contact area between the fish or the meat being mounted and the surface of the touch panel display 111 gradually increases as defrosting of the fish or the meat advances.

Accordingly, it is possible to determine the progress of defrosting of the object whose shape is changed by being defrosted, for example, frozen fish or meat, based on the contact area between the mounted object and the surface of the touch panel display 111. Furthermore, when there is no change in the contact area after a predetermined time elapses, it is possible to determine that the defrosting is completed.

Furthermore, when the frozen fish or meat is mounted on the touch panel display 111 as it is, the type (ID) of fish or meat as the object to be mounted is hard to determine based on a contact pattern of the mounted surface. Here, for example, in regard to the object which can be molded in a frozen state, it is possible to determine the type of frozen material mounted on the touch panel display 111 or to determine the defrosted degree by freezing the object such that the object has a bottom surface realizing a predetermined pressing pattern like a case of the above-described various kinds of objects.

Certainly, the ID recognition of the object such as frozen fish or meat does not have to be performed based on the pressing pattern of the object, and the type thereof may be recognized through a manual input by the user.

Each operation of processing in the above-described interface system is realized by causing the CPU 801 to execute programs stored in the memory 802.

In addition, programs causing a computer constituting the interface system to execute each of the above-described operations can be provided. In the present embodiment, a case in which programs for implementing functions to carry out the invention are recorded in a memory area provided in a device in advance is exemplified, but, without being limited thereto, the same programs may be downloaded to the device from a network or a computer-readable recording medium that stores the same program may be installed in the device. Any computer-readable recording medium which can store programs can be used as the recording medium. Specifically, examples of the recording medium include an internal storage device internally installed in a computer such as a ROM or a RAM; a portable storage medium such as a CD-ROM, a flexible disk, a DVD disk, a magneto-optical disk, or an IC card; a database holding computer programs; another computer and the database thereof; and a transmission medium on a line. Furthermore, the functions obtained by being installed or being downloaded in advance may be implemented by cooperating with an OS (operating system) in the device.

In addition, a part or the entirety of the program may be an execution module which is dynamically generated.

Moreover, it is obvious that at least a part of various processes to be implemented by causing a processor to execute programs in each of the above-described embodiments can be carried out by ASIC 807 through a circuit operation.

Furthermore, according to the above-described embodiments, a case in which the pressing pattern of the "pressing portion" provided in one object has one type is exemplified, but, without being limited thereto, the pressing pattern provided to one object does not necessarily have only one type.

For example, when an object is intended to be used by being mounted on the touch panel in a plurality of postures, a plurality of pressing portions can be provided according to the plurality of mounted postures. In this case, the touch panel can be pressed in the pressing patterns indicating different identification information according to the mounted posture even in a case of one object, and more various types of information can be provided to the user. Furthermore, when a plurality of pressing portions are provided in the object, the plurality of pressing portions are not necessarily formed completely individually and, for example, a configuration in which a part of a pressing portion is also used as a part or the entirety of another pressing portion can be employed.

For example, in a case of a coin type object having a "front side" and a "back side," two kinds of mounted postures, which can be typically adopted, of a mounted posture in which the "front side" is facing upward and a mounted posture in which the "back side" is facing upward are assumed. In such a case, information related to a portion which can be visually recognized by the user of the object in a state of being mounted on the touch panel can be displayed on the touch panel by displaying information related to the surface of the object when the object is mounted by setting the "front side" to be the side facing upward and by displaying information related to the back surface of the object when the object is mounted by setting the "back side" to be the side facing upward.

Furthermore, in the above-described embodiments, the configuration in which the touch panel display is adopted in the interface system is exemplified, but, without being limited thereto, a touch panel having no image displaying functions may be adopted instead of a touch panel display when the above-described interface system is used for only a simple information input or an operation input and image information does not need to be output from the touch panel display.

What is claimed is:

1. An interface system, comprising:
a touch panel that supports a multi-touch input;
a pattern detecting unit that detects a pressing pattern of a pressing portion having a predetermined shape provided on a mounted portion of a predetermined object to be mounted on the touch panel; and
an identification information acquisition unit that acquires information indicated by the pressing pattern to be detected by the pattern detecting unit as identification information of the object mounted on the touch panel,
wherein the touch panel is a touch panel display, and the system further comprises a display control unit that allows, an image based on information to be acquired as the identification information of the object mounted on the touch panel display, to be displayed corresponding to an area being pressed by the pressing portion of the object on the touch panel display,
wherein the object includes a light guiding unit that projects light received in a predetermined light receiving area on a bottom surface on a predetermined projection area which is different from the light receiving area in the object, and
the display control unit allows, an image corresponding to the identification information which is information indicated by the pressing pattern to be detected, to be displayed in an area corresponding to the light receiving area in the touch panel display.

2. The system according to claim 1,
wherein the area to be pressed by the pressing portion having a predetermined shape of the object on the touch panel is not point-symmetric in a direction of an operation input surface of the touch panel, and
the pattern detecting unit determines an orientation of the object being mounted on the touch panel in the direction of the operation input surface of the touch panel based on the pressing pattern to be detected.

3. The system according to claim 1, further comprising a weight determining unit that determines the weight of the object being mounted on the touch panel based on a contact area of the pressing pattern to be detected.

4. The system according to claim 1, further comprising a hardness determining unit that determines the hardness of the object being mounted on the touch panel based on the contact area of the pressing pattern to be detected.

5. The system according to claim 1, wherein the light guiding unit includes a plurality of the light receiving areas to be set in areas which are different from each other on the bottom surface of the object and a plurality of the projection areas to be set in areas which are different from each other and correspond to the plurality of light receiving areas respectively.

6. An interface system, comprising:
a touch panel that supports a multi-touch input;
a pattern detecting unit that detects a pressing pattern of a pressing portion having a predetermined shape provided on a mounted portion of a predetermined object to be mounted on the touch panel; and
an identification information acquisition unit that acquires information indicated by the pressing pattern to be detected by the pattern detecting unit as identification information of the object mounted on the touch panel, wherein the touch panel is a touch panel display, and the system further comprises a display control unit that allows, an image based on information to be acquired as the identification information of the object mounted on the touch panel display, to be displayed corresponding to an area being pressed by the pressing portion of the object on the touch panel display,
wherein the object includes a reflection surface that reflects an image to be displayed on the touch panel display in at least a part of the area of the surface, and
the display control unit allows, an image corresponding to the identification information which is information indicated by the pressing pattern to be detected, to be displayed in an area corresponding to the reflection surface in the touch panel display and allows the image to be reflected on the reflection surface of the object to be visually recognized by a user.

7. The system according to claim 6,
wherein user position information that specifies a position of the user to visually recognize a reflected image from the reflection surface with respect to the touch panel display is acquired, and
the display control unit sets an area for displaying an image in the touch panel display based on the user position information to be acquired.

8. An object for an operation input used to input an operation to a touch panel that supports a multi-touch input, comprising:
an object main body; and
a pressing portion that is provided on a mounted portion of the object main body so as to be brought into contact with the surface of the touch panel when the object main body is mounted on the touch panel and presses an operation input surface of the touch panel with a pressing pattern showing identification information corresponding to the object main body, wherein the touch panel is a touch panel display, and a display control unit allows, an image based on information to be acquired as the identification information of the object mounted on the touch panel display, to be displayed corresponding to an area being pressed by the pressing portion of the object on the touch panel display,
wherein the object further comprises a light guiding unit that projects light received in a predetermined light receiving area on a bottom surface of the object main body on a predetermined projection area which is different from the light receiving area in the object main body.

9. The object according to claim 8, wherein an area to be pressed by the pressing portion having a predetermined shape of the object on the touch panel is not point-symmetric in a direction of the operation input surface of the touch panel.

10. The object according to claim 8, wherein an area of the pressing portion that is in contact with the operation input surface of the touch panel is changed according to a change in weight of the object main body.

11. The object according to claim 8, wherein the light guiding unit includes a plurality of the light receiving areas to be set in areas which are different from each other on the bottom surface of the object main body and a plurality of the projection areas to be set in areas which are different from each other and correspond to the plurality of light receiving areas respectively.

12. An object for an operation input used to input an operation to a touch panel that supports a multi-touch input, comprising:
an object main body; and
a pressing portion that is provided on a mounted portion of the object main body so as to be brought into contact with the surface of the touch panel when the object main body is mounted on the touch panel and presses an operation input surface of the touch panel with a pressing pattern showing identification information corresponding to the object main body, wherein the touch panel is a touch panel display, and a display control unit allows, an image based on information to be acquired as the identification information of the object mounted on the touch panel display, to be displayed corresponding to an area being pressed by the pressing portion of the object on the touch panel display, wherein the object main body includes a reflection surface for allowing a user to visually recognize an image by reflecting the image to be displayed on the touch panel display in at least a part of the area of the surface.

13. A method of supporting an operation input, comprising:
detecting a pressing pattern of a pressing portion having a predetermined shape provided on a mounted portion of a predetermined object to be mounted on a touch panel that supports a multi-touch input with the touch panel; and
acquiring information indicated by the pressing pattern to be detected as identification information of the object to be mounted on the touch panel, wherein the touch panel is a touch panel display, and the method further comprises displaying an image based on information to be acquired as the identification information of the object mounted on the touch panel display corresponding to an area being pressed by the pressing portion of the object on the touch panel display, wherein the object includes a light guiding unit that projects light received in a predetermined light receiving area on a bottom surface on a predetermined projection area which is different from the light receiving area in the object, and an image corresponding to the identification information which is information indicated by the pressing pattern to be detected is displayed in an area corresponding to the light receiving area in the touch panel display.

14. The method according to claim 13, wherein the area to be pressed by the pressing portion having a predetermined shape of the object on the touch panel is not point-symmetric in a direction of an operation input surface of the touch panel, and an orientation of the object being mounted on the touch panel in the direction of the operation input surface of the touch panel is determined based on the pressing pattern to be detected.

15. The method according to claim 13, wherein the weight of the object mounted on the touch panel is determined based on a contact area of the pressing pattern to be detected.

16. The method according to claim 13, wherein the hardness of the object that is mounted on the touch panel is determined based on the contact area of the pressing pattern to be detected.

17. The method according to claim 13, wherein the light guiding unit includes a plurality of the light receiving areas to be set in areas which are different from each other on the bottom surface of the object and a plurality of the projection areas to be set in areas which are different from each other and correspond to the plurality of light receiving areas respectively.

18. A method of supporting an operation input, comprising:

detecting a pressing pattern of a pressing portion having a predetermined shape provided on a mounted portion of a predetermined object to be mounted on a touch panel that supports a multi-touch input with the touch panel; and acquiring information indicated by the pressing pattern to be detected as identification information of the object to be mounted on the touch panel, wherein the touch panel is a touch panel display, and the method further comprises displaying an image based on information to be acquired as the identification information of the object mounted on the touch panel display corresponding to an area being pressed by the pressing portion of the object on the touch panel display, wherein the object includes a reflection surface that reflects an image to be displayed on the touch panel display in at least a part of the area of the surface, and an image corresponding to the identification information which is information indicated by the pressing pattern to be detected is displayed in an area corresponding to the reflection surface in the touch panel display and is visually recognized by a user by being reflected on the reflection surface of the object.

19. The method according to claim 18, wherein user position information that specifies a position of the user to visually recognize the reflected image from the reflection surface with respect to the touch panel display is acquired, and an area for displaying an image in the touch panel display is set based on the user position information to be acquired.

* * * * *